United States Patent
Schaefer

(10) Patent No.: US 7,684,016 B1
(45) Date of Patent: Mar. 23, 2010

(54) METHOD AND APPARATUS FOR MEASURING DISTANCES USING LIGHT

(76) Inventor: Philip R. Schaefer, 88 High Country Rd., Weaverville, NC (US) 28787

( * ) Notice: Subject to any disclaimer, the term of this patent is extended or adjusted under 35 U.S.C. 154(b) by 227 days.

(21) Appl. No.: 11/804,420

(22) Filed: May 18, 2007

Related U.S. Application Data

(63) Continuation-in-part of application No. 10/641,850, filed on Aug. 15, 2003, now Pat. No. 7,221,437.

(60) Provisional application No. 60/875,742, filed on Dec. 19, 2006.

(51) Int. Cl.
*G01C 3/08* (2006.01)

(52) U.S. Cl. .................... 356/4.01; 356/5.01

(58) Field of Classification Search ........... 356/4.01, 356/5.01
See application file for complete search history.

(56) References Cited

U.S. PATENT DOCUMENTS

| | | | |
|---|---|---|---|
| 3,654,477 A * | 4/1972 | Benjamin, Jr. ........... 250/552 |
| 4,716,430 A | 12/1987 | Stauffer |
| 4,752,799 A | 6/1988 | Stauffer |
| 4,988,981 A | 1/1991 | Zimmerman et al. |
| 5,149,952 A | 9/1992 | Tanaka et al. |
| 5,229,829 A | 7/1993 | Nihei et al. |
| 5,532,813 A | 7/1996 | Ohishi et al. |
| 5,541,723 A | 7/1996 | Tanaka |
| 5,686,942 A | 11/1997 | Ball |
| 5,701,006 A | 12/1997 | Schaefer |
| 5,865,443 A | 2/1999 | Abe |
| 5,963,309 A | 10/1999 | Nakanishi et al. |
| 6,172,375 B1 | 1/2001 | Kindaichi |
| 6,611,741 B2 | 8/2003 | Michi et al. |
| 6,972,690 B1 * | 12/2005 | Schaefer ............. 340/850 |
| 7,030,969 B2 * | 4/2006 | Giger ............... 356/5.02 |
| 7,342,649 B2 * | 3/2008 | Waibel .............. 356/5.01 |
| 2002/0166885 A1 | 11/2002 | Sugawara |
| 2003/0128153 A1 | 7/2003 | Paradie et al. |
| 2003/0174054 A1 | 9/2003 | Shimomura |
| 2006/0120595 A1 | 6/2006 | Nakamura et al. |
| 2007/0283590 A1 * | 12/2007 | White et al. ............. 33/763 |
| 2008/0231829 A1 * | 9/2008 | Hinchliff et al. ........ 356/4.01 |

FOREIGN PATENT DOCUMENTS

JP 356033509 A 4/1981
WO WO 2005029122 A1 * 3/2005

OTHER PUBLICATIONS

Foley, James D.; Chapter 16 Shading Models "Fundamentals of Interactive Computer Graphics" Copyright 1982; pp. 575-580; Addison-Wesley Publishing Company, Inc.

* cited by examiner

*Primary Examiner*—Isam Alsomiri
(74) *Attorney, Agent, or Firm*—John D. Lister

(57) ABSTRACT

A method and device for measuring a distance to an object with light determines the distance by measuring the relative intensity of light reflected from the object and traveling over two or more paths of differing optical length. Light is emitted by one or more light sources; reflected from a surface of the object; and the reflected light is detected by one or more light detectors. The light detector(s) generate signals based on the intensity of reflected light detected and the signals are utilized to calculate the distance from the device to the object.

15 Claims, 15 Drawing Sheets

METHOD AND APPARATUS FOR MEASURING DISTANCES USING LIGHT

CROSS-REFERENCE TO RELATED APPLICATIONS

This application is a continuation-in-part of copending U.S. patent application Ser. No. 10/641,850, filed Aug. 15, 2003, which claims the benefit of U.S. Provisional Application No. 80/405,079 filed Aug. 20, 2002 and also claims the benefit of copending U.S. Provisional Application No. 60/875,742, filed Dec. 19, 2006.

GOVERNMENT LICENSE RIGHTS

This invention was made with United States government support under one or more SBIR grants from the National Institutes of Health. The United States government has certain rights in this invention.

BACKGROUND OF THE INVENTION

The subject invention relates to a method and device for measuring a distance from the device to an object using light, and, more specifically, to a method and device for measuring a distance from the device to an object wherein light is emitted from one or more light sources of the device and reflected from a surface of the object to one or more light detectors of the device. The light travels over paths of differing length between the light source(s), the object reflecting the light, and the light detector(s). The light intensity measured by the light detector(s) generates electrical signals that are used to calculate the distance from the device to the object.

There are various applications in which it is desirable to use light to measure distances. Examples of such applications include measuring a distance between a camera and a subject for auto focusing, measuring distances during surveying, measuring astronomical distances, etc. Correspondingly, a variety of methods that use light for measuring distances have been described. One method for measuring distances with light is to measure the time for a light pulse to travel between two points. For example, U.S. Pat. No. 5,532,813, Ohishi et al, discloses a method for measuring distances using lasers wherein a distance-measuring means calculates relatively long distances, e.g. kilometers in distance, to a target based on the time difference between a light beam emission and the reception of a return light beam from the target. However, the lasers and optics in such approaches are too complex and expensive for budget limited or highly miniaturized applications. Other, lower cost methods for the time of flight measurement of distances have been described. For example, U.S. Pat. No. 5,701,006, Schaefer, discloses a method for measuring distances in which Light Emitting Diodes (LEDs) and photodetectors are used in fiber optics, and modulation frequencies in the MHz range are used to measure time delays. Although such approaches use lower-cost LEDs and photo-detectors, relatively short, properly shaped pulses are required. Electronics in the radio frequency range must also be used to process the signals. These factors introduce higher levels of noise into the overall system, thus relatively complex electronics circuitry or specialized, high power pulse generation at the LED is needed.

For applications such as camera focusing, it is common to transmit a light spot with an LED, then receive an image of the spot at the receiver. By measuring the location of the spot on the received image, the distance to the subject can be determined by triangulation. The basic approach is subject to problems with range and reliability, and various improvements have been described in the following patents. For example, U.S. Pat. No. 5,541,723, Tanaka, discloses a method of measuring distances that involves the transmission at different angles of two differing light distributions. In this method, the information on the amount of signals received tells how much signal does not impinge on the object of interest. Nakanishi, et al., in U.S. Pat. No. 5,963,309, shows multiple LEDs and photodetectors that are used to increase the range and resolution. Kindaichi, in U.S. Pat. No. 6,172,375, uses two spaced lens that form images. From these images, positions are measured and calculated for the purpose of increasing the reliability of measurements. However, these approaches still require the use of lenses in order to obtain images of light spots or patterns. The need for lenses increases the bulk as well as the cost of a distance-measuring system.

OBJECTS AND ADVANTAGES OF THE PRESENT INVENTION

Therefore, several objects and advantages of the present invention are:
(a) to provide a system for measuring distances with light,
(b) to provide distance measurement without the need for lenses, enabling an optics measurement system using only Light Emitting Diodes (LEDs) and photodiodes in the optics,
(c) to provide this feature without the need to measure the position of received light on an image,
(d) to provide a system that can perform distance measurements rapidly, and
(e) to provide a system to obtain images of distance data.

Still further objects and advantages of the present invention will become apparent from a consideration of the ensuing description and drawings.

SUMMARY OF THE INVENTION

The present invention is a system for measuring the distance to an object, using light. The light intensity over multiple paths is measured, the paths being of differing optical length. The relative light intensity from the paths is used to calculate the distance to the object.

In one embodiment of the present invention, two or more light sources and one light detector are used. Light is sequentially transmitted from each source, and received at the light detector. In another embodiment of the present invention, one light source and two or more light detectors are used. Light is simultaneously received at both light detectors.

In another embodiment of the present invention, light is sequentially transmitted from two or more light sources, and an imaging device, such as a digital camera, is used to provide an array of distances containing distance information in each pixel.

In another embodiment of the present invention, a distance measurement device is attached to the finger or wrist of a person, and provides information on distances from the person to objects.

While the distance-measuring system of the present invention may be used to measure various distances from distances less than 10 centimeters in length to distances up to or greater than 5 meters in length, the distance-measuring system of the present invention provides an inexpensive, noncomplex, easy to use, distance-measuring system that is particularly well suited for measuring and/or monitoring distances to an object wherein the distance from the distance-measuring system to the object ranges from about 10 centimeters to about 5 meters. Over this preferred measurement range, the distance-measuring system of the subject invention has an accuracy of about ±10%.

DESCRIPTION OF THE PREFERRED EMBODIMENTS

Figure 1:
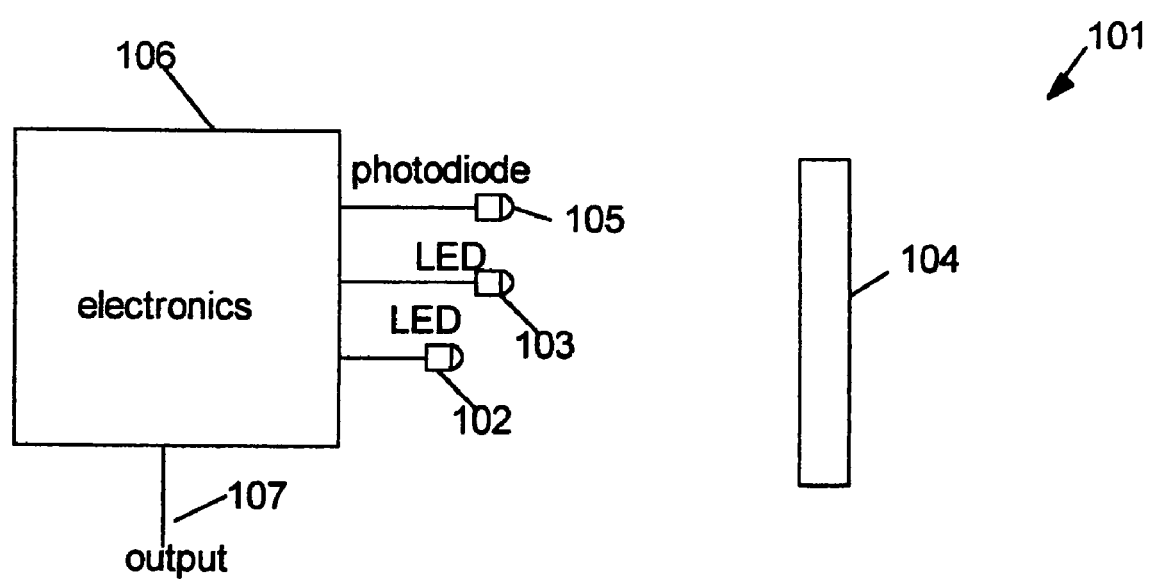
FIG. 1 is a block diagram of a preferred embodiment of the distance-measuring system of the present invention.

FIG. 1 is a block diagram of a preferred embodiment of a distance-measuring system 101 of the present invention, in which a "far" light source 102 and a "near" light source 103 are located at different distances from an object 104. Preferably, the light sources 102 and 103 have equal intensities and are LEDs (light-emitting diodes). Electronics 106 provides driving signals to sequentially illuminate the light source 102 and the light source 103. A light detector 105, preferably a photodiode, sequentially receives light from the light source 102 and the light source 103 that is reflected from the object 104. Preferably, the light sources 102 and 103 and the light detector 105 are located adjacent each other and contained in a single device. While for certain applications the light sources 102 and 103 need only be sequentially illuminated once, for other applications the light sources 102 and 103 are repeatedly illuminated sequentially for a selected period of time to obtain a distance measurement or distance measurements between the device housing the light sources and light detector and an object. Typically, the near light source 103 of the system 101 is from 2 to 10 centimeters closer to the object 104 than the far light source 102. Preferably, the light sources 102 and 103 and the light detector 105 are located and oriented relative to each other so that the light beams emitted by the light sources 102 and 103 and the resulting light beams from the object 104 that are detected by the light detector 105 are substantially collinear over a distance-measuring range selected for the system. The emitted light beams and the reflected light beams detected by the system are separated preferably by 10 centimeters or less, more preferably by 5 centimeters or less, and most preferably by 2 centimeters or less over the selected distance-measuring range. With this arrangement of the light sources 102 and 103 and the light detector 105, within the distance-measuring range of the system, the light beams emitted by the light sources 102 and 103 and the resulting light beams reflected off of the object 105 and detected by the light detector 105 are reflected from the same or substantially the same common area of the object's surface. Typically, the light sources 102 and 103 and the light detector 105 are located immediately adjacent each other and oriented relative to each other so that the light beams emitted by the light sources 102 and 103 to be reflected from an object within the distance-measuring range of the system and the light beams reflected from the object within the distance-measuring range of the system and detected by the light detector 105 are substantially collinear or substantially collinear and intersect at a common point that is located in front of the system a distance that is from about half of the maximum selected distance of the measuring range to about the selected maximum distance of the measuring range for the system. In a typical distance-measuring device utilizing the system 101, the system 101 of the device may be set up as follows: first, a preferred distance-measuring range for the system is selected, e.g. a range from about 10 centimeters to about 5 meters, and second, the light sources 102 and 103 and the light detector 105 are then located immediately adjacent each other and oriented so that (i) the light sources 102 and 103 and the light detector 105 are each aimed at a common point a selected distance in front of the device, e.g. the detectors are aimed at a common point between about 2.5 and about 5 meters in front of the device, and (ii) the emitted light beams from the light sources 102 and 103 and the reflected light beams reflected from an object 104 within the distance-measuring range of the system and detected by the light detector 105 are substantially collinear. With this arrangement, over a major portion of the measurement range, the light emitted by the light sources 102 and 103, reflected by the object 104, and detected by the light detector 105 will be reflected from the same or substantially the same area of the reflecting surface of the object 104.

If the object 104 is relatively near the light sources 102 and 103, for example, a distance that is five times the direct (straight line) distance between light source 102 and light source 103, the intensity of light received at the light detector 105 when the light source 103 is on will be significantly larger than the intensity of light received at the light detector 105 when the light source 102 is on. If, however, the object 104 is relatively far from the light sources 102 and 103, the intensity of light received at the light detector 105 when the light source 103 is on will be approximately equal to the intensity received at the light detector 105 when the light source 102 is on. Thus, the electronics 106, which is also connected to the light detector 105, can compute a direct (straight line) distance value from the light source 103 to the object 104 by using the relationship between the two intensities of reflected light input to the light detector 105 from the light emitted by the light sources 102 and 103 and reflected back to the light detector 105 by the object 104. The above relationship in intensities is true regardless of the reflectivity of object 104.

Thus, when using light to measure the distance to an object, the present invention provides a way to cancel out the adverse affect that an object's reflectivity may have on the accuracy of such a distance measurement. Likewise, if the surface of the object 104 reflecting the light from the light sources 102 and 103 is not oriented perpendicularly to the direction of the light emitted from the light sources 102 and 103, the change in received intensity of reflected light by the detector 105 from the object 104 due to the surface angle of the object 104 will be substantially equal for the light sources 102 and 103. Thus, when using light to measure the distance to an object, the present invention also provides a way to cancel out the adverse affect that an object's surface angle may have on the accuracy of such a distance measurement. Furthermore, if the object 104 is of complex shape, the object 104 can be thought of as a collection of tiny surfaces. The superposition of these tiny surfaces will thus provide a way to cancel out the affect of shape when measuring distances using light.

Preferably, the light sources 102 and 103 illuminate an area larger than the area over which the light detector 105 is sensitive. This is preferable so that if the reflecting surface of the object 104 is near the edge of the area illuminated by either light source 102 or 103 and an equal area of the reflecting surface is thereby not illuminated by both of the light sources 102 and 103, significant errors in the distance measurement will not be caused. As discussed above, for the purposes of simplicity, the light sources 102 and 103 of the distance-measuring system 101 are of equal intensity. However, provided the relative intensities of the light sources 102 and 103 are known, the electronics 106 can be set up to compute the direct distance from the light source 103 to an object 104 utilizing light sources 102 and 103 of different intensities. While, the distance measured for the distance measurement of the system 101 has been the distance from the near light source 103 to the object 104, electronics 106 may be set up to measure the distance from the far light source 102 or the light detector 105. Since the distances of the light sources 102 and 103 and the light detector 105 to the object 104 typically vary no more than 2 to 10 centimeters, either of the light sources or the light detector may be used to define the distance from the device embodying the system 101 to the object 104 without substantially affecting the accuracy of the system.

Figure 2:
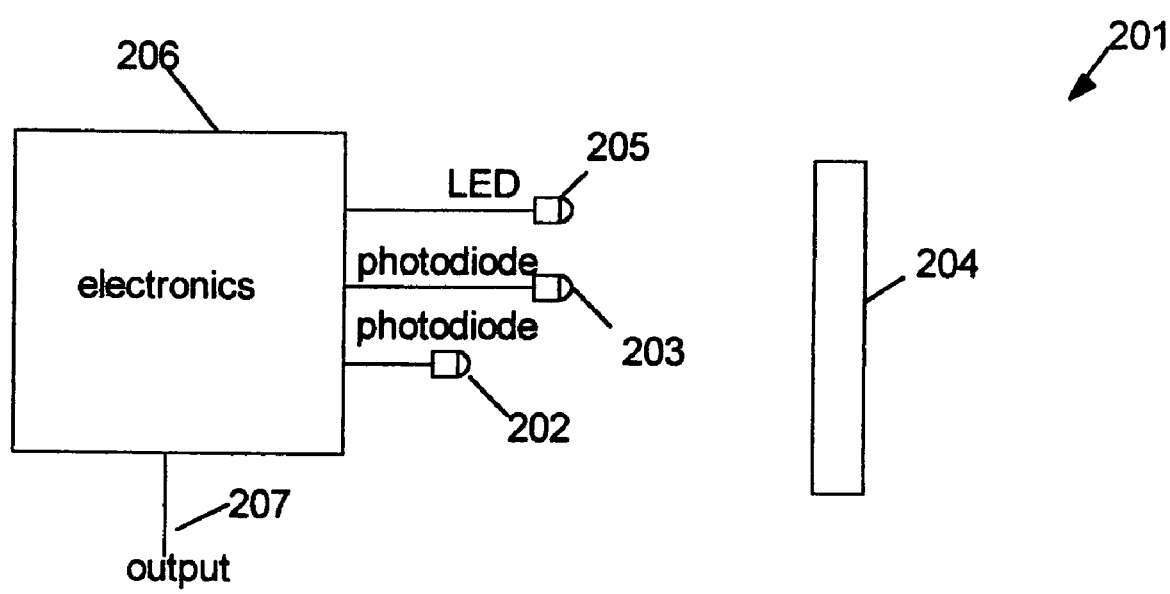
FIG. 2 shows a diagram of an alternate embodiment of the distance-measuring system of the present invention.

FIG. 2 shows a diagram of an alternate embodiment 201 of the distance-measuring system of the present invention. In this embodiment, a single light source 205 is used to illuminate an object 204. Two light detectors 202 and 203, preferably photodiodes, are located at different direct (straight line) distances from the object 204. Preferably, the light detectors 202 and 203 and the light source 205 are located adjacent each other and contained in a single unit. Typically, the near light detector 203 is from 2 to 10 centimeters closer to the object 204 than the far light detector 202. Preferably, the light detectors 202 and 203 are located and oriented relative to each other and the light source 205 so that the light beam emitted by the light source 205 and the resulting reflected light beams from the object 204 detected by the light detectors 202 and 203 are substantially collinear over a distance-measuring range selected for the system. The emitted light beams and the reflected light beams detected by the system are separated preferably by 10 centimeters or less, more preferably by 5 centimeters or less, and most preferably by 2 centimeters or less over the selected distance-measuring range. With this arrangement of the light detectors 202 and 203 and the light source 205, within the distance-measuring range of the system, the light beam emitted by the light source 205 and the resulting light beams reflected off of the object 205 and detected by the light detectors 202 and 203 are reflected from the same or substantially the same common area of the object's surface. Typically, the light source 205 and the light detectors 202 and 203 are located immediately adjacent each other and oriented relative to each other so that the light beam emitted by the light source 205 to be reflected from an object within the distance-measuring range of the system and the light beams reflected from the object within the distance-measuring range of the system and detected by the light detectors 202 and 203 are substantially collinear or substantially collinear and intersect at a common point that is located in front of the system a distance that is from about half of the maximum selected distance of the measuring range to about the selected maximum distance of the measuring range for the system. In a typical distance-measuring device utilizing the system 201, the system 201 of the device may be set up as follows: first, a preferred distance-measuring range for the system is selected, e.g. a range from about 10 centimeters to about 5 meters, and second, the light detectors 202 and 203 and the light source 205 are then located immediately adjacent each other and oriented so that (i) the light detectors 202 and 203 and the light source 205 are each aimed at a common point a selected distance in front of the device, e.g. the detectors are aimed at a common point between about 2.5 and about 5 meters in front of the device, and (ii) the emitted light beam from the light source 205 and the reflected light beams reflected from an object 204 within the distance-measuring range of the system and detected by the light detectors 202 and 203 are substantially collinear. With this arrangement, over a major portion of the measurement range, the light emitted by the light source 205, reflected by the object 204, and detected by the light detectors 202 and 203 will be reflected from the same or substantially the same area of the reflecting surface of the object 204.

Electronics 206 uses the signals generated by the received intensities from light detectors 202 and 203 to compute the distance from a device embodying the system 201 to the object 204. This is analogous to the way the two sequentially measured intensities from light detector 105 are used in system 101, above, to measure the direct distance from a device embodying the system 101 to the object 104.

Preferably, the light detectors 202 and 203 are sensitive to light over a larger area than is illuminated by the light source 205. This is preferable so that if object 204 is near the edge of the area detected by either light detector and an equal area of the reflecting surface is thereby not detected by both of the light detectors 202 and 203, significant errors in the distance measurement will not be caused.

Figure 3:
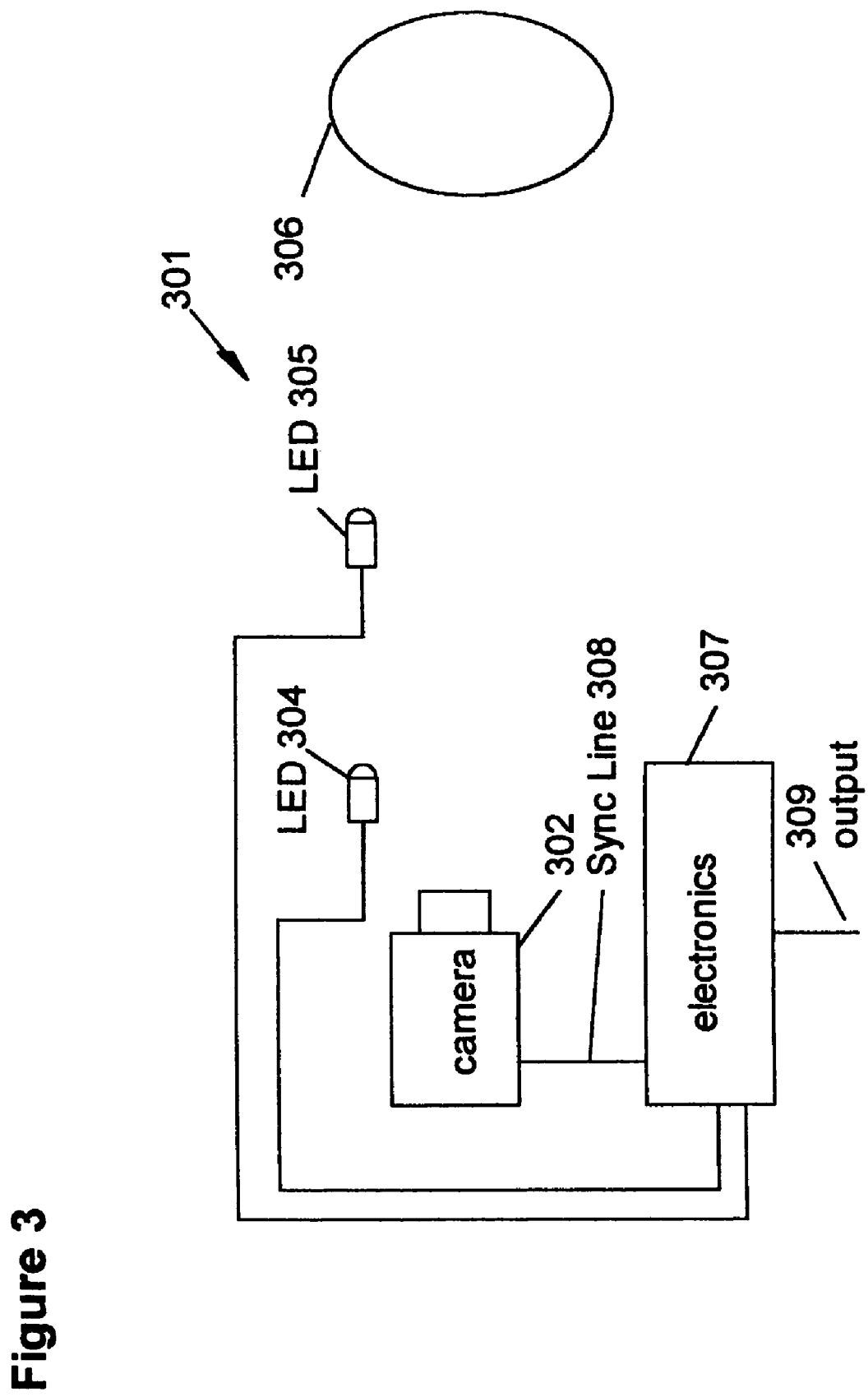
FIG. 3 is a block diagram of a distance imager system of the present invention.

FIG. 3 shows another embodiment of the invention. Distance imager system 301 produces an array of distance measurements to an object 306 corresponding to pixels in an image. This embodiment of the present invention could be used, for example, as a face shape sensor in a security system. In this embodiment of the present invention, light sources 304 and 305, preferably of equal intensity, are sequentially and, preferably, repeatedly illuminated by electronics 307. During each activation of one of the light sources 304 and 305, a digital camera 302 acquires one or more frames of image data from the light reflected to the camera 302 from the object 306. Preferably, the electronics 307 activates the light sources 304 and 305 in synchronization with the sync line 308, which is an output from the digital camera 302. Alternately, if the digital camera can be controlled by sync line 308, the electronics can command the camera to acquire frames of data by sync line 308 as each of the light sources 304 and 305 is illuminated. Methods for synchronizing the digital camera 302 and the electronics 307 will be apparent to those of ordinary skill in the art. The method of obtaining range or direct distance data is substantially the same as for the direct distance measurement system 101 of FIG. 1. In this embodiment, each pixel of the camera 302 can be thought of as a single light detector. Thus, a distance value can be calculated for each pixel in the image.

In operation, the distance-measuring system 101, 201, or 301 is aimed toward the object 104, 204, or 306, respectively. The respective electronics lights the appropriate sources and stores the received intensities in memory. Based on these intensities, one or more distance values are computed, and provided through the output 107, 207, or 309.

Figure 4:
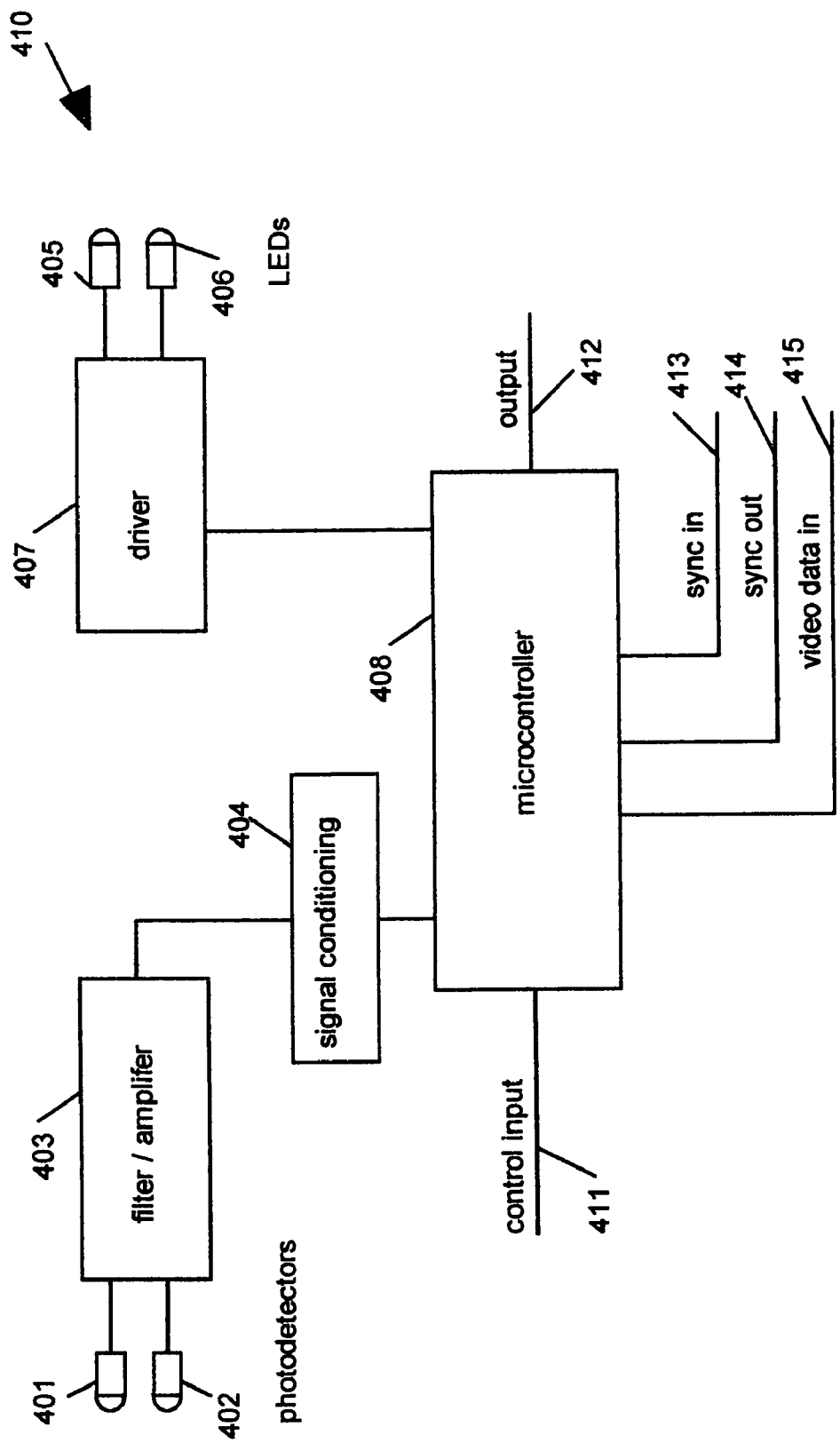
FIG. 4 is a block diagram of a preferred embodiment of an electronics module of the present invention.

FIG. 4 is a block diagram of a preferred embodiment of an electronics module 410 used in the distance-measuring systems 101, 201, and 301 of the present invention. The LEDs 405 and 406 are illuminated, as needed, by a driver 407. The design of the driver 407 will be apparent to those of ordinary skill in the art. Preferably, the driver 407 provides a modulated driving signal to the LEDs 405 and 406; for example, the driving signal may be in the range of 100 Hz to 100 kHz. Photodetectors 401 and 402 serve as light detectors. Filter/amplifier 403 accepts the signals from the photodetectors and brings them to a useful voltage level. If the driver 407 provides modulated signals, the Filter/amplifier 403 preferably includes a filter, for example, a band pass filter, to extract the modulated signal from the background noise. A signal conditioner 404 takes the signal from the amplifier 403 and converts it into the format required by a microcontroller 408. Preferably, this includes the conversion of the signal amplitude into a voltage between 0 and 5 volts, for input to an analog-to-digital input of the microcontroller 408. If the driver 407 provides modulated driving signals, the signal conditioner 404 preferably includes a demodulation circuit, such as a peak detector. The signal conditioner 404 also preferably includes voltage-limiting circuitry to prevent excessive input voltages to the microcontroller 408. The design of these circuits will be apparent to those of ordinary skill in the art.

The microcontroller 408 includes a control input 411, preferably a serial data line, for example, from a PC. This input is monitored by the microcontroller software to set parameters, for example, data acquisition rate and modulation frequency. This input also preferably includes commands such as to begin and end measurement functions. The microcontroller 408 also includes a data output 412, preferably a serial data line, for example, to a PC. This output provides the distance measurements computed by the microcontroller software. The design of the control input and data output circuitry will be apparent to those of ordinal skill in the art.

Optionally, the microcontroller 408 includes a camera sync input 413, if a digital camera is used for data acquisition. The sync input 413 is used by the software to sequentially illuminate the LEDs 405 and 406, so that the correct LEDs are illuminated during each frame of video data. Optionally, the microcontroller 408 includes a camera sync output 414, if a digital camera accepting sync input pulses is being used. The sync output 414 is used by the software to command the camera to start the acquisition of a frame of video data at the correct time, in synchronization with the lighting of the correct LEDs. Video data in 415 is used to obtain the pixel intensity measurements from the camera, for performing the distance calculations. The electronics circuitry for these functions will be apparent to those of ordinal skill in the art.

In all embodiments of the present invention described above, a set of two or more light intensity measurements is obtained for each distance measurement desired. The algorithm to calculate distances from the light intensities is described here in connection with embodiment 101, but applies equally to embodiments 201 and 301.

The algorithm is based on a mathematical illumination model. In the preferred embodiment of the invention, the algorithm is based on a diffuse reflection illumination model (see Foley & van Dam, "Fundamentals of Interactive Computer Graphics", Addison-Wesley Publishing Company, Inc.,© 1982, pp. 575-580). Preferably, if it is assumed that the direct (straight line) spacing between light sources 102 and 103 is given by D, the unknown distance from the light source 103 to object 104 is L, and the surface angle of object 104 with respect to the direction of light source 103 is Q, the light intensity detected by light detector 105 from light source 103, i103, is given by:

$$i103 = k \cos Q/L^2$$

and the light intensity detected from light source 102, i102, is $$i102 = k \cos Q/(L+D)^2$$

The ratio of these two measurements is then $$i101/i102 = (L+D)^2/L^2$$

The algorithm solves this expression for L, using solution techniques apparent to those of ordinary skill in the art. For a system with multiple measurements, for example, the distance imager system 301, this is repeated for each measurement point, for example, for each pixel in the acquired images. Techniques for implementation of the algorithm in the microcontroller or in an external device, such as but not limited to a personal computer, will be apparent to those of ordinary skill in the art.

Figure 5:
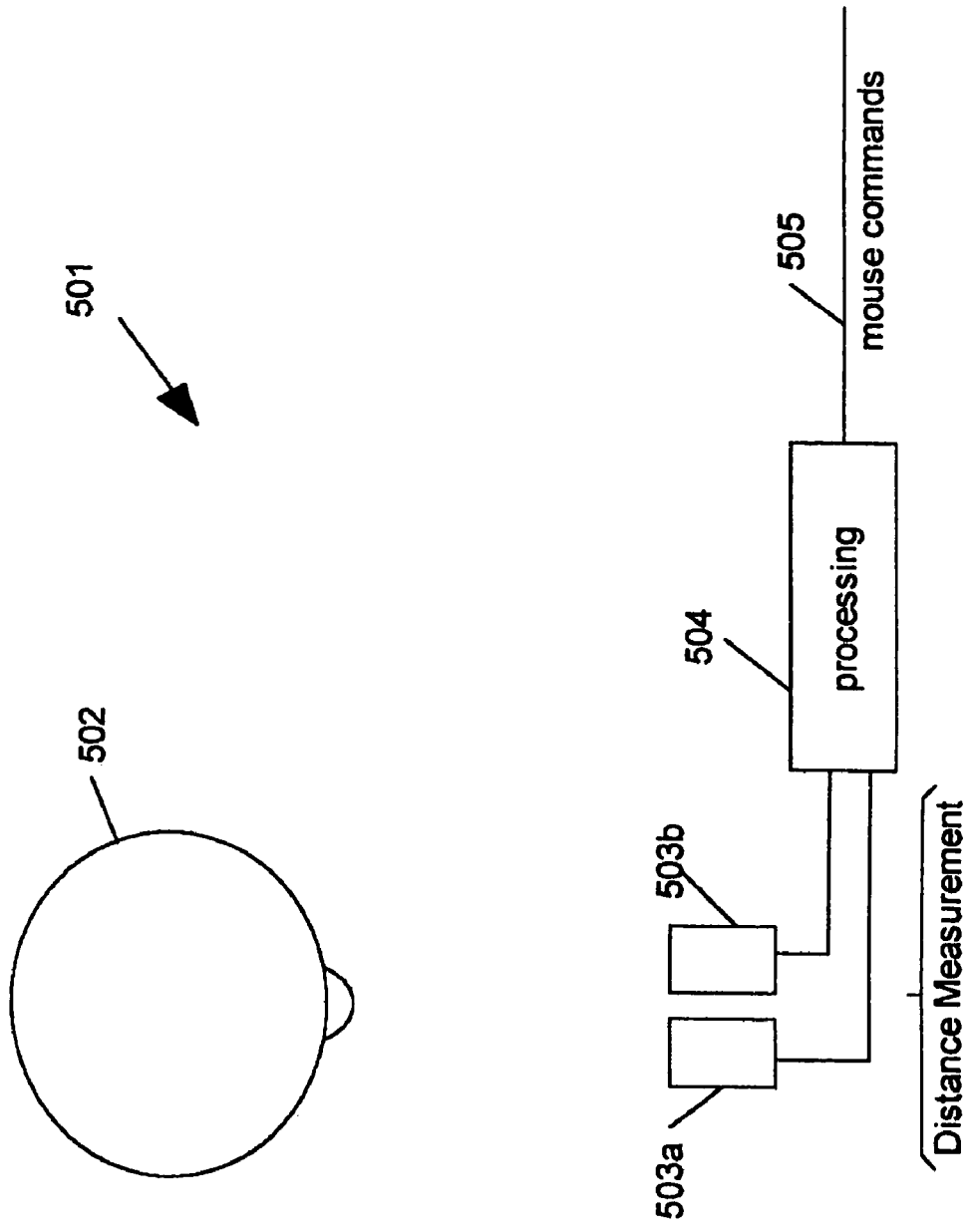
FIG. 5 is a block diagram of the present invention being applied as a head tracking device.

FIG. 5 is a block diagram of the present invention being applied as a head tracking device 501, for example, a head tracking device for disabled persons, such as people who cannot use their hands to control a computer mouse. In this embodiment, the invention is used to provide mouse commands, so that the disabled user can perform mouse functions by moving his or her head 502, rather than through the use of the mouse. The head tracking device 501 makes distance measurements to several locations on the user's head 502, and generates mouse commands to an output 505 from these measurements.

In a preferred embodiment of this application, distance measurement devices 503a and 503b are used to make distance measurements to areas on the left and right parts of the head, respectively. Preferably, the measurement devices 503a and 503b are measurement systems such as distance the measuring system 101. Alternately, other embodiments of the present invention can be used as the measurement devices 503a and 503b. When the user moves his or her head 502 to the left, the average distance measured by device 503a will tend to decrease, whereas the average distance measured by device 503b will tend to increase. If the measurement devices 503a and 503b are aimed toward the forehead, as the user tilts the head forward, the average distances measured by both measurement devices will tend to decrease. Processing 504 takes the distance measurements and the changes in distance measurements to calculate head motion parameters, and then converts these into mouse commands, which are sent to a computer through the output 505.

Figure 6:
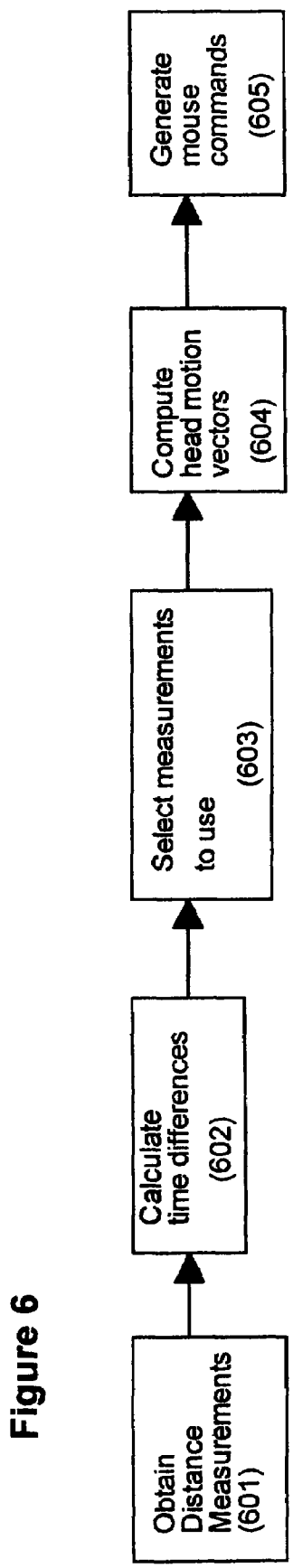
FIG. 6 is a flowchart showing the process of generating computer mouse commands from the distance measurements.

FIG. 6 is a flowchart showing the process of generating mouse commands from the distance measurements. First, in step 601, the distance measurements are obtained, as described above. Preferably, in step 602, the changes over time of each distance are obtained. Alternately, the actual distances could be used for computing head pointing information. In step 603, a subset of the measurements is selected to use. If there are only two measurements, such as in the preferred embodiment of FIG. 5, all measurements are used. Alternately, if a larger set of measurements is used, two measurements are selected, for example, the pair of side by side measurements with the greatest time difference could be selected. Alternately, all measurements could be used with a weighting system based on the relative time differences. From the selected measurements, a head motion vector is computed in step 604. In the preferred embodiment, the difference between the left and right measurements from devices 503a and 503b is used as the horizontal component of the motion vector, and the sum of the left and right measurements is used as the vertical component. Finally, in step 605, the vector is converted into a mouse command. For example, the head motion vector from step 604 can be converted into the horizontal and vertical components of the mouse command. The implementation of each of these steps will be apparent to those of ordinary skill in the art.

Figure 7:
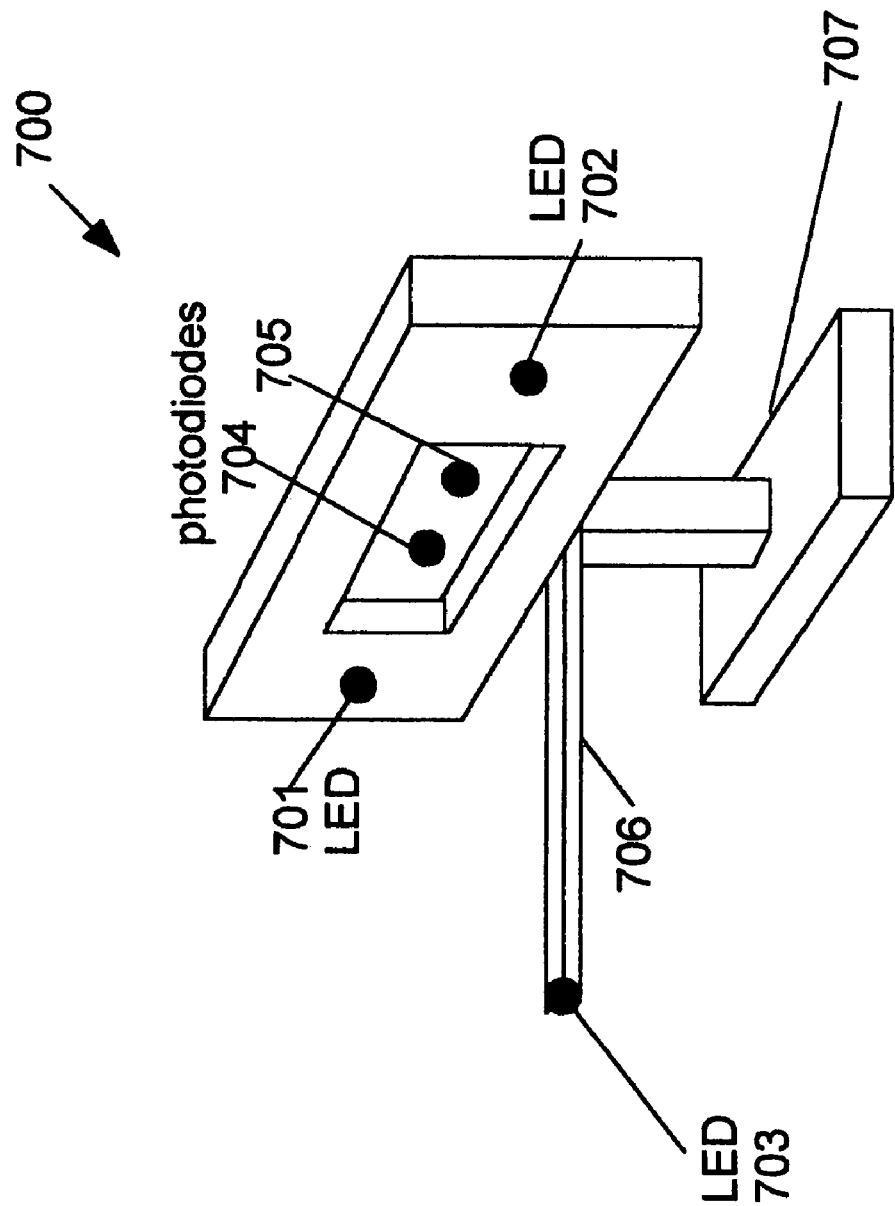
FIG. 7 illustrates a preferred embodiment of a head tracking optical unit that shares some of the components of two distance-measuring devices of the present invention.

FIG. 7 illustrates a preferred embodiment of a head tracking optical unit 700 that shares some of the components of two distance-measuring devices, such as devices 503a and 503b in FIG. 5. Rather than completely independent sets of LEDs and photodiodes, some components are shared. Photodiode 704 and photodiode 705 are the light detectors for the two distance-measuring devices, and are oriented so that they detect light from horizontally offset areas of the user's face. The LED 703, held in its position by arm 706, serves as the "near" LED for both measuring devices. LED 701 and LED 702 are simultaneously illuminated to serve as the "far" LED for both measuring devices. Preferably, all LEDs are arranged to avoid direct transmission of light to photodiodes 704 and 705. The entire unit is preferably mounted on stand 707, which can contain adjustments to aim the light at the user's face. Connection and use of the head tracking optical unit 700 according to the present invention will be apparent to those of ordinary skill in the art.

Figure 8:
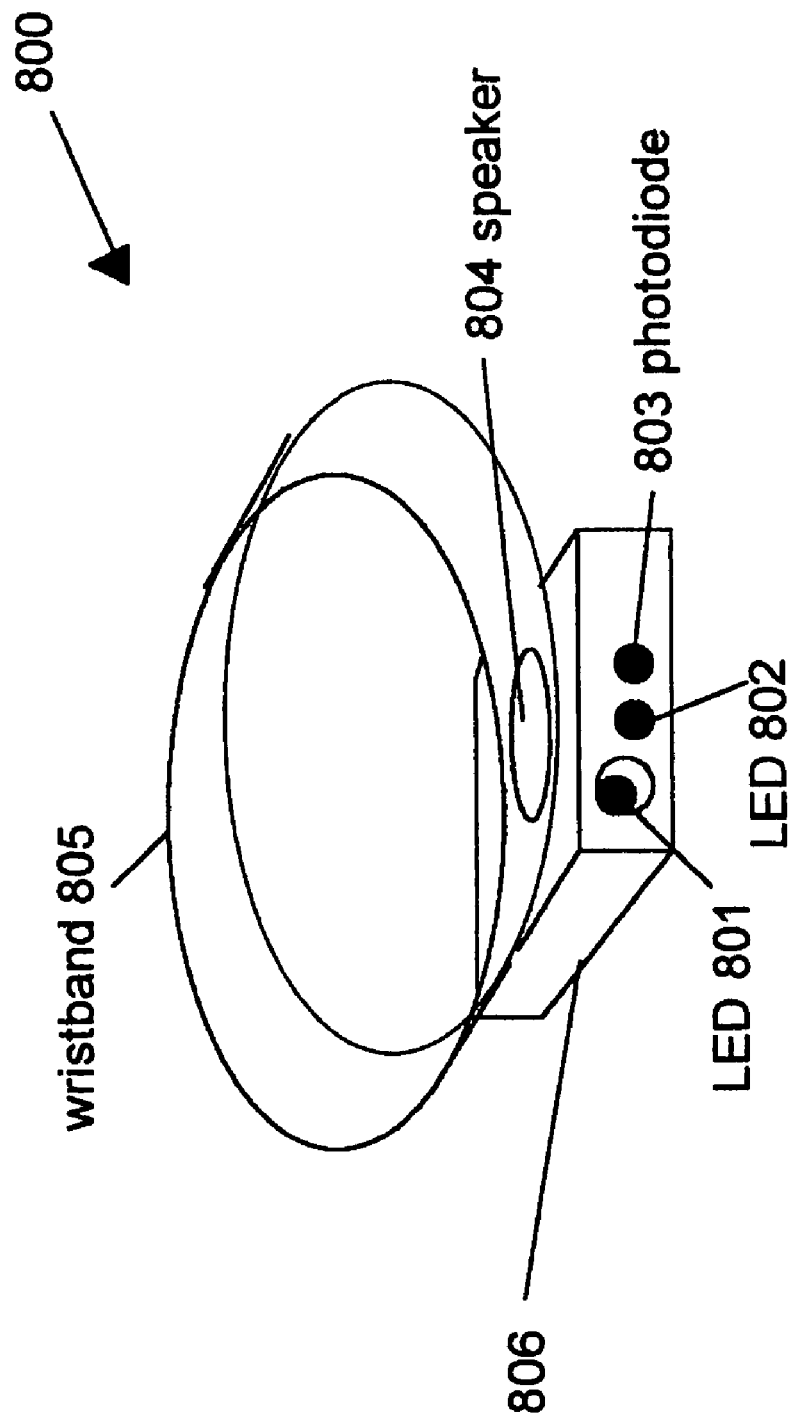
FIG. 8 illustrates an application of the present invention as wristband distance sensor.

The present invention can also be used as an aid for blind people to locate nearby objects. FIG. 8 illustrates a preferred embodiment of this application, as wristband distance sensor 800. A wristband 805 holds enclosure 806, containing the electronics circuitry. Preferably, the LEDs and photodiodes are configured according the preferred embodiment of the distance-measuring device 101. LED 801 is the "far" LED and LED 802 is the "near" LED. Photodiode 803 receives the reflected light signals transmitted by the LEDs.

Preferably, the output of the distance sensor is a vibration signal that can be felt by the user. For example, a miniature speaker 804 can be attached to the wristband 805, so that the vibration is easily felt on the user's wrist. The speaker preferably is controlled to vary its vibration frequency as a function of the measured distance. Alternately, the amplitude, or both amplitude and frequency could be varied. The mechanical and electrical design and connection of these parts according to the present invention will be apparent to those of ordinary skill in the art.

Figure 9:
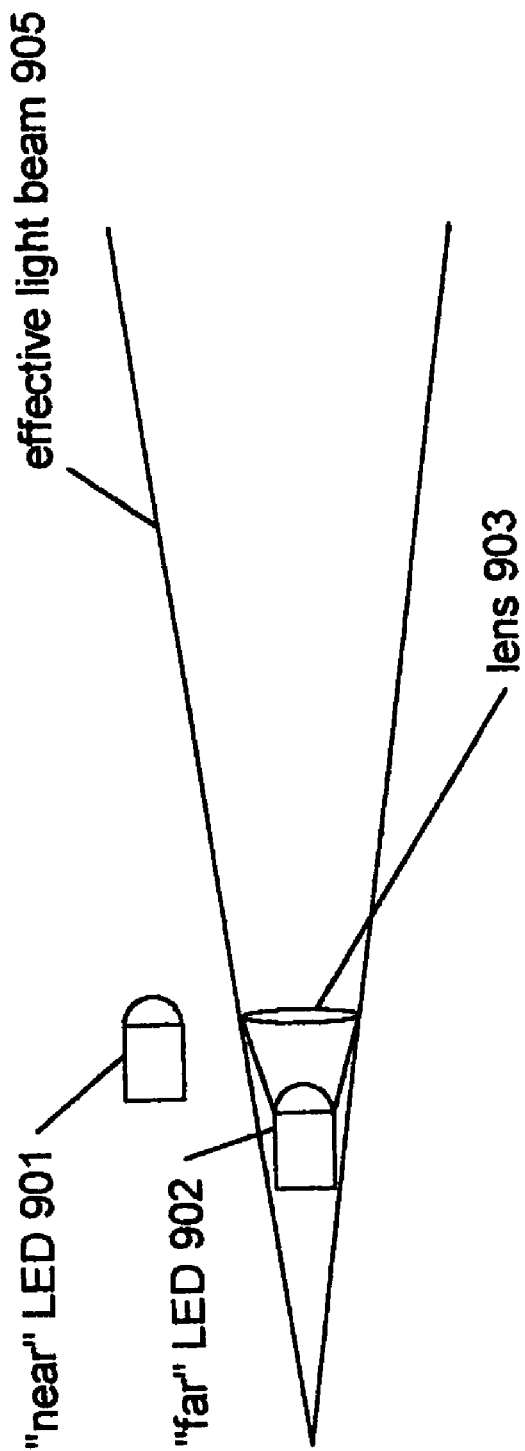
FIG. 9 shows an alternate embodiment of an optical arrangement of light-emitting diodes using a lens.

FIG. 9 shows an alternate embodiment for the near and far light sources 102 and 103 of the system 101. In the embodiment of FIG. 9, the alternate embodiment has an optical arrangement of a "near" LED 901 and a "far" LED 902. This embodiment is useful for applications where the maximum allowable distance between the two LEDs is limited. For example, this could be done in the wristband distance sensor 800. A lens 903 is placed in the light path of the "far" LED 902. The lens bends the light beam 905 such that the effective optical distance from the LED 902 to the reflective surface of the object is greater than the physical distance. For example, a convex lens may be used for this purpose. Optionally, a lens could be placed in front of the "near" LED 901 to make the optical distance from the "near" light detector to the reflective surface of the object less than the physical distance to the reflecting surface of the object.

Figure 10:
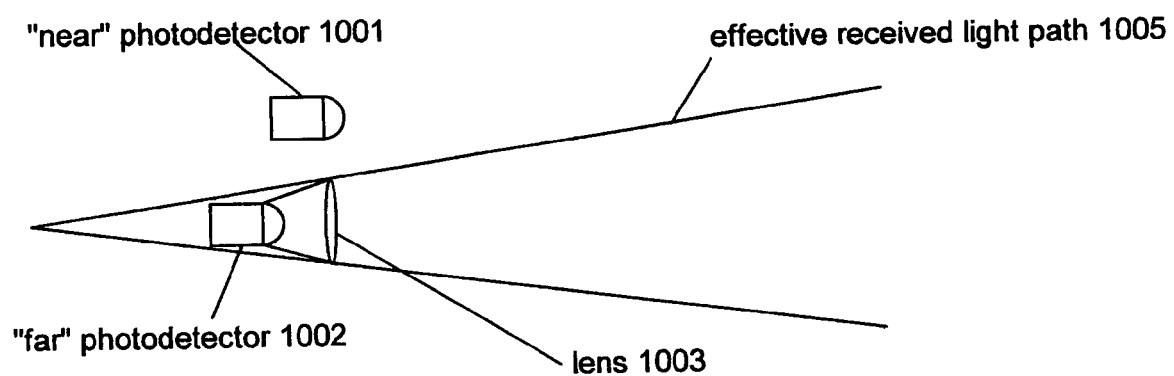
FIG. 10 shows an alternate embodiment of an optical arrangement of photodiodes using a lens.

FIG. 10 shows an alternate embodiment of the optical arrangement for the "near" and "far" light detectors 203 and 202 used in the system 201. This embodiment is useful for applications where the maximum allowable distance between the two light detectors is limited. For example, this could be done in the wristband distance sensor 800. A lens 1003 is placed in the reflected light path of the "far" light sensor 1002. The lens bends the reflected light beam from the object such that the effective optical distance from the reflective surface of the object to the "far" light sensor 1002 is greater than the physical distance. For example, a convex lens may be used for this purpose. Optionally, a lens could be placed in front of the "near" light detector 1001 to make the optical distance from the reflective surface of the object to the "near" light detector less than the physical distance to the reflecting surface of the object. The selection of lenses and arrangement of the components to do this will be apparent to those of ordinary skill in the art.

Packaging the Invention as a Ring

Figure 11:
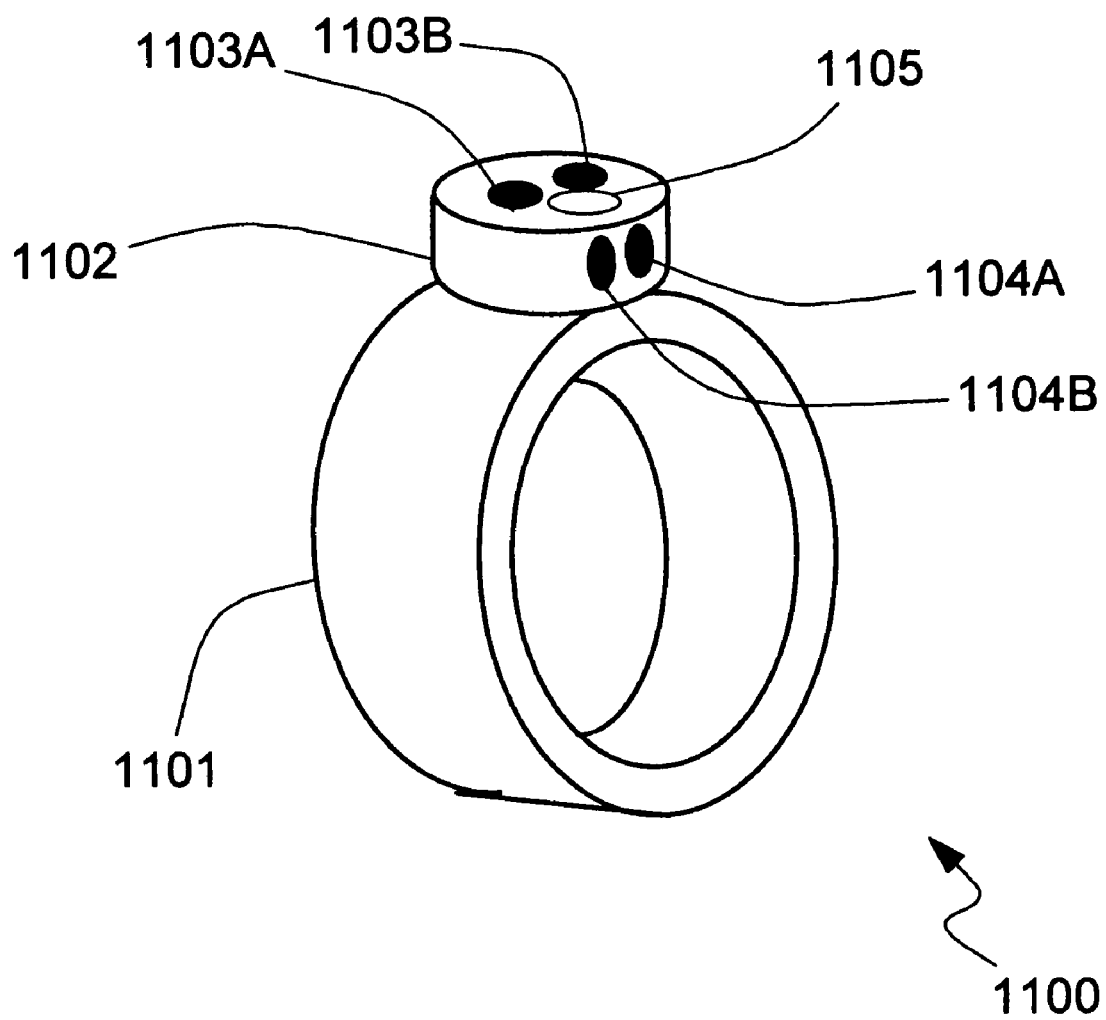
FIG. 11 shows a preferred embodiment of the present invention as a ring-based distance sensor that can be worn on a user's finger

FIG. 11 depicts a preferred embodiment of the invention that is a ring-based distance sensor 1100 that can be worn on the user's finger. A small electronics module 1102 can be mounted to the surface of a ring 1101, or alternately embedded into the structure of ring 1101. Optical devices, such as LEDs, photodiodes, or phototransistors, are included in electronics module 1102. For example, optical devices 1103A and 1103B can be used to detect the presence or distance to objects. Optical devices 1103A and 1103B can be oriented to transmit and receive light in a direction perpendicular to the surface of ring 1101. Alternately, or in addition, optical devices can be oriented in other directions, for example, optical devices 1104A and 1104B can be used, which are oriented to transmit and receive light along the axis of ring 1101. Optionally, optical devices could be rotatably mounted to the ring so that the user can aim them in a desired orientation. Optionally, one or more switches, such as switch 1105 can be included for a user to turn the unit on and off or for controlling operating modes, such as which optical devices (e.g. 1103A and 1103B or 1104A and 1104B) are used.

To accommodate the range of possible user finger sizes, the ring could be manufactured as separate parts that fit together, such as an electronics module and a ring base, so that a single type of electronics could be attached to the correct size of ring for each user. Alternately, the ring could be made adjustable, e.g., by a gap, allowing bending of ring 1101 to vary its size, or by the insertion of inner rings within ring 1101 to vary the size of the opening for the finger.

General Purpose Distance Measurement Approach

Figure 12:
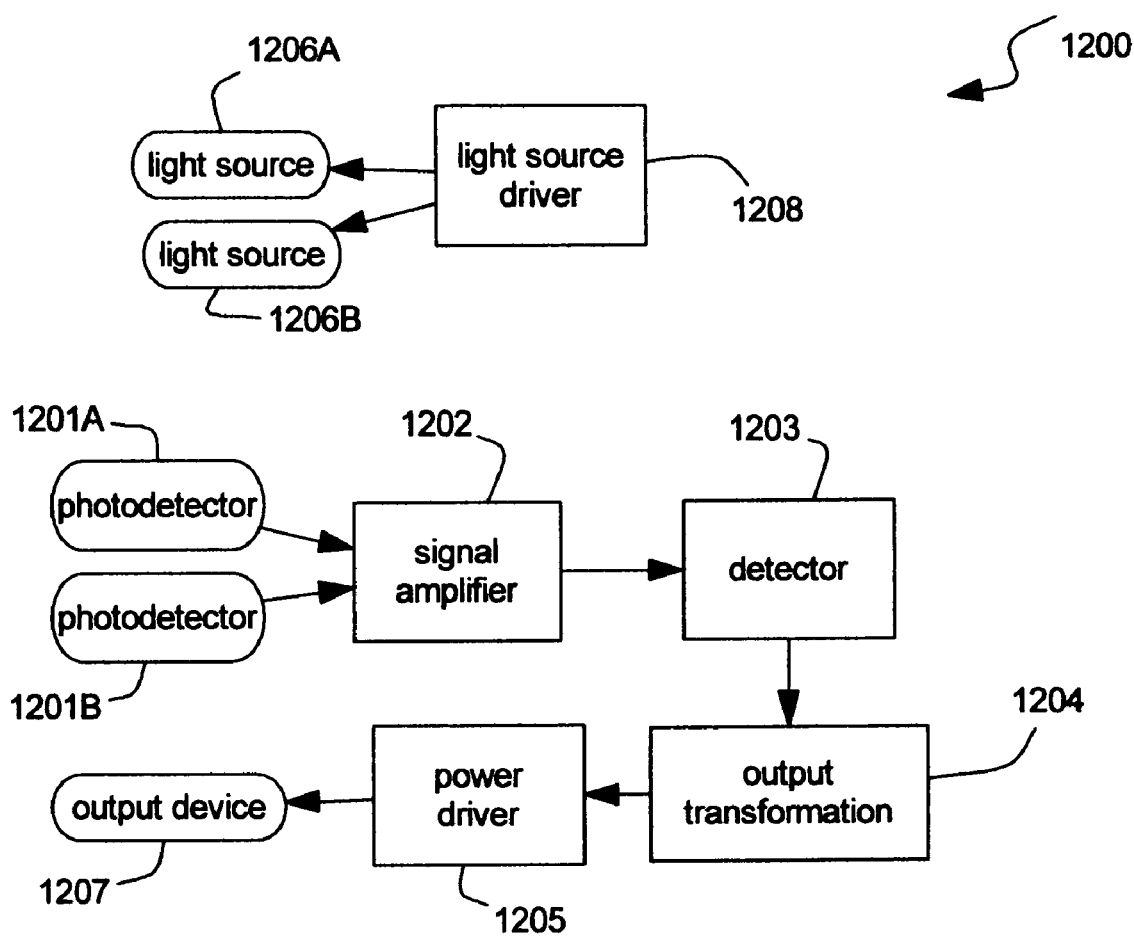
FIG. 12 shows a block diagram of a preferred embodiment of a signal-processing module that can be used to generate and process optical signals in the present invention.

FIG. 12 shows a block diagram of a preferred embodiment of signal processing module 1200 that can be used to generate and process optical signals in the present invention. The preferred embodiment of the signal processing module involves one or more photodetectors, for example, photodetectors 1201A and 1201B, which can be, for example, photodiodes or phototransistors, and one or more light sources, for example light sources 1206A and 1206B, which can be, for example LEDs, for reflecting light from objects, then using an output device 1207 to communicate with a user. Two light sources 1206A and 1206B and two photodetectors 1201A and 1201B are shown, however any number of such devices may be used, depending on the options described below. Output device

1207 is preferably an audio or tactile output device. The electrical output of each photodetector 1201A and 1201B is a varying signal that results from the light input to it. The signal amplifier 1202, which increases the strength of the varying output signal from each photodetector 1201A and 1201B to provide measurement data that will be used to evaluate the distance to objects, is optional and may not be needed if the output signal from each photodetector 1201A and 1201B is strong. If the signal amplifier 1202 is not used, the output signals from the photodetectors 1201A and 1201B would serve as the measurement data directly and the output signals from the photodetectors 1201A and 1201B would not be passed through the signal amplifier block 1202.

Light source driver 1208 provides an electrical signal to generate light from light sources 1206A and 1206B. Preferably, light source driver 1208 produces a modulated voltage to drive the light sources 1206A and 1206B, for example at a frequency of 1000 Hz. In this case, detector 1203 preferably converts the received AC signal, resulting from reflection of the light from light sources 1206A and 1206B into photodetectors 1201A and 1201B, into a set of numbers or a DC voltage. The detector 1203 could be based on one of several detection techniques known in the art, for example, a half-wave rectification circuit, a synchronous detector, or a microcontroller-based sampling circuit. If the light source driver 1208 provides a non-modulated or DC voltage to drive the light sources 1206A and 1206B, the detector 1203 may not be needed. The light source driver 1208, light sources 1206A and 1206B, photodetectors 1201A and 1201B, and signal amplifier 1202 and detector 1203 can be thought of as an optical sensing device, because this part of signal processing module 1200 provides all the data needed to get the measurement data needed to provide distance information.

To create a modulated signal to drive the light sources 1206A and 1206B, light source driver 1208 creates an AC or pulsed DC output. Preferably, this modulated signal is generated by an output signal from a microcontroller. Alternately, the modulated signal can be generated by a hardware oscillator known in the art. Alternately, if a non-modulated signal is used to drive the light sources 1206A and 1206B, light source driver 1208 can be as simple as connecting power supply voltage to the light sources 1206A and 1206B, preferably through a driver transistor or resistor. Specific circuits to create these drive signals are known in the art.

Data Filtering

As in many sensor-based systems, data filtering is preferably used to reduce noise and keep the output signal stable for the user. Data filtering can occur in hardware or software, and preferably occurs as part of signal amplifier 1202, detector 1203, or as part of output transformation 1204. Low pass filtering is preferably used, and is known in the art. However, some special features of the distance measurement application of the subject invention make improvements to a straightforward low pass filter desirable. One such feature is the adjustment or updating of the state values of the filter so that a blind user does not accidentally bump into objects. For example, if the low pass filter has too low a cutoff frequency, the system could be too slow to respond to a small object that is suddenly in view of the sensor. The filter can be sped up by increasing the cutoff frequency, or slowed down by decreasing the cutoff frequency. Thus, the following techniques, alone or in combination, are useful:

If a trend in the data shows distances becoming smaller at either a certain rate or below a certain distance, the filter should be sped up (e.g., give a higher cutoff point to the low pass filter)

If the signal levels are strong, or if the variance or variability seen in recent data is low, speed up the filter, likewise, in low signal levels or when variance is higher, slow the filter down.

It should be noted that as the distance becomes closer, the signal levels are likely to be stronger with less variability, so the latter technique may handle both cases. An alternate embodiment to speeding up or slowing down a single, standard low pass filter is to create a filter that performs a weighted average of multiple low pass filters, each with a different cutoff frequency. The distribution of weighting among the filters would be controlled to control the response rate of the overall filter. One special case of a weighted average filter is to switch between filters, i.e., the weights are 0 or 1. However, care must be taken to avoid discontinuities when switching between filters. One technique for avoiding such discontinuities in changing the relative weights of filters is by adding a slowly-decaying offset value to the output of a filter being switched to, so that its output is, at the time of switching, the same value as the output of the previously-used filter. As time progresses, the offset value decays to zero, such that the output value moves to the actual value of the filter being switched to. For the general case of a weighted average filter, an equivalent offset value can be found by subtracting the output of the filter with the previous weights from that of the filter with the new weights, at the time when the weights are to be changed.

Operation of Output Transformation

Output Transformation 1204 implements a transformation from a set of one or more signal values originating from photodetectors 1201A and 1201B into one or more user values indicating distance or direction or object size or user output values describing one or more of these parameters. The operations performed by the Output Transformation 1204 will depend on which optical distance-measuring technologies are being used by the system. The optical distance-measuring technology used to interpret the light received by the photodetectors 1201A and 1201B as a distance could be via the multiple-distance concept shown in FIGS. 1 and 2. Alternately, the optical distance-measuring technology can be based on the offset angle concept taught in U.S. Pat. No. 7,123,351 to Schaefer, in which two or more light sources are separated in a direction perpendicular to that to the object being measured, and oriented in different directions, and in which the distance is computed by using the separation and the light source radiation patterns. This approach can also be equivalently used with multiple photodetectors. Alternately, other optical distance-measuring techniques known in the art could be used. A particularly simple technique is a straightforward intensity-measurement scheme, where the amplitude of the reflected light is converted into a distance estimate. In the simplest case, this could involve only one photodetector 1201A and one light source 1206A, which would likely lead to the smallest overall size for wristband distance sensor 800 or the ring-based distance sensor 1100. Although the simple light-intensity technique will have substantial errors due to variations in reflectivity of objects, it is often good enough to indicate if objects are nearby, giving qualitative information about object distances, and thus serve the purposes of a very small and simple device.

A preferred distance-measuring technology is to combine the results of several distance-measuring techniques, for example, one or two amplitude-measuring channels, and one based on an offset angle technique. A simple average of the outputs of the several distance-measuring techniques could be used, but a preferred embodiment is to consider at least three distance-interpretation measurements and discard the one that is the farthest from the average of the others. Alternately, the distance can be found by discarding the largest and the smallest calculations, and averaging the remaining distances.

It may be known that in certain signal situations, certain distance techniques are more reliable than others. For example, when signal levels are very low, techniques that require differences between two or more signal levels or involving ratios between them may be noisier, so that other techniques, such as the simple amplitude mapping, should be used alone, or at least a weighted average that weights the simple amplitude mapping should be used when one or more of the signals drop below a threshold value. Thus, it is preferable to utilize such rules in the Output Transformation processing.

Mapping into User-Friendly Output

For whatever technique is used to interpret the light received by photodetectors 1201A and 1201B as outputs to the user as distance information, the Output Transformation 1204 performs the mapping between the received light signals and the output signal to the user. If one of the optical distance techniques described above is used, the Output Transformation 1204 preferably implements the corresponding math or uses a lookup table to convert one or more received light values into an output value for power driver 1205. The lookup tables can be generated either by analysis or by empirically testing the response of the system to various objects at various distances and recording the results in the table. Alternately, the simplest case may be to transform the received light into one of either a "near" or a "far" value, and thus provide only an on/off control signal to the power driver 1205.

The Output Transformation 1204 may output the transformation from photodetector values to user output signal values in various formats. For example, the output could be a square wave in which the frequency or amplitude of the square wave is varied to represent distance. Preferably, pulses of DC or AC could be generated, in which the Output Transformation 1204 varies the timing of the on and off times of the pulses, for example, leaving more off time between fixed-length on pulses as the distance increases. Combinations of the above output modalities could also be used. The preferred implementation of the Output Transformation 1204 is as a microcontroller and firmware in the microcontroller. However, it could be as simple as a circuit that converts the DC signal received from a photodetector into a vibration intensity, or other such mapping that will be apparent from the art.

Other examples of output mappings, which can be varied by the Output Transformation 1204 to give information to the user, include:
  Intensity of vibration and/or sound
  Frequency of vibration and/or sound
  Pulse length of a pulsed signal, i.e., a pulse train of vibration and/or sound
  Pulse separation of a pulse train of vibration and/or sound
  Changes in frequency or intensity of vibration and/or sound during a pulse Measurement of More than Pure Distance For any of the distance determination techniques, there can optionally be additional photodetectors in addition to the photodetectors 1201A and 1201B and/or additional light sources in addition to the light sources 1206A and 1206B for more advanced sensing capabilities of the system. Furthermore, the two or more photodetectors can be aimed in different directions with respect to each other (aimed other than parallel with respect to each other) and/or the two or more light sources can be aimed in different directions with respect to each other (aimed other than parallel with respect to each other). For example, the photodetector 1201A could be aimed in a different direction than the photodetector 1202B while the light sources 1206A and 1206B are aimed in the same direction with respect to each other (aimed parallel with respect to each other) to provide information on objects in multiple directions or the light source 1206A could be aimed in a different direction than the light source 1206B while the photodetectors 1201A and 1201B are aimed in the same direction with respect to each other (aimed parallel with respect to each other) to provide information on objects in multiple directions. Alternately, the two or more photodetectors, such as the photodetectors 1201A and 1201B, could have different beam detection-angle widths and/or the two or more light sources, such as the light sources 1206A and 1206B, could have different beam emission-angle widths to provide information about the size or extent of objects being sensed. For example, the photodetector 1201A could have a narrow or focused beam detection-angle width for the detection of a reflected beam from an object while the photodetector 1201B has a relatively wider or relatively less focused beam detection-angle width for the detection of a reflected beam from an object. The light source 1206A could have a narrow or focused beam emission-angle width for projecting a beam onto an object while the light source 1206B has a relatively wider or relatively less focused beam emission-angle width for projecting a beam onto an object. In addition, the two or more photodetectors can be aimed in the same or different directions with respect to each other and/or the two or more light sources can be aimed in the same or different directions with respect to each other while the photodetectors could have different beam detection-angle widths and/or the light sources could have different beam emission-angle widths to provide information about the size or extent of objects being sensed. Some examples of how the distance measurements from these multiple light sources 1206A and 1206B or light detectors 1201A and 1201B can be interpreted include:

If Optical devices 1201A or 1201B or 1206A or 1206B are aimed in different directions
  Closer distances from one or some of the detectors indicate the object is in the aimed direction of that one detector or those detectors.
  Similar distances between multiple detectors indicate a relatively large object.

If Optical devices 1201A or 1201B or 1206A or 1206B have different beam or beam detection widths
  Closer distances from a narrower beam or beam detection width indicates a relatively smaller object
  Closer distances from a wider beam or beam detection width indicates a small object is not within the narrower beam
  Similar distances from the wider and narrower beam or beam detection widths indicate a relatively large object.

Output Transformation 1204 may output the above information to power driver 1205. Preferably, the information about direction and distance is extracted from the measurement data by firmware in a microcontroller. This information is preferably outputted simultaneously with the distance indication to the user, by using a different output mapping than is being used to indicate distance. For example, if pulse separation is being used to indicate distance, the size of the object could be indicated by the frequency of the vibrational pulses. Alternately, this additional information on object size or direction can be indicated to the user in a separate mode of operation of the system, for example, selected by the user with switch such as switch 1105.

User Output Devices

Power Driver 1205 generates output signals for Output device 1207. Examples of audio devices that could be used for Output Device 1207 are small speakers or piezoelectric transducers that generate a sound. Power driver 1205 would generate the appropriate electrical signal to create sound from these devices. Examples of tactile output devices that could serve as Output Device 1207 are the vibration motors used in cell phones, speaker-like devices with a mass mounted onto or instead of the cone to make vibrations, solenoids, a small rod or other object that taps the finger through ring 1101, or even electrical stimulation electrodes mounted to the ring 1101 or wristband 805. Instead of being mounted to the ring 1101 or wristband 805, these devices could also be mounted separately, for example in keying fob or as part of a cell phone. For any of these cases, Power driver 1205 generates a signal to cause Audio and/or Tactile device 1207 to create the audio and/or tactile output, using circuitry that is known in the art. In some cases, the requirements of Audio and/or Tactile device 1207 may be simple enough that the output circuitry of Output Transformation 1204 also serves as the Audio and/or Tactile device driver function of Power Driver 1205.

Optionally, the light sources 1206A and 1206B can be eliminated or turned off in certain modes of operation, and the system can operate as a passive light detector. This could be useful for finding windows or lamps, or for examining the surroundings based on the light of the scene. For example, this mode of operation could be useful to identify food and other objects on a dinner table. The device could optionally be configured such that photodetectors 1201A, 1201B, etc., have sensitivities at different colors (e.g., red, green, and blue) to detect color, and correspondingly provide color outputs based on the relative values of each light color received. Other optional features could be a simple barcode reader for shopping or use in the home.

Automatic Gain Control (AGC)

In operation, it is likely that the strength of optical signals received by photodetectors 1201A and 1201B will vary over a wide dynamic range, primarily due to the wide range of distances over which light will be reflected. To avoid errors due to excessively high or low signal levels, a means to automatically control the gain of the system can be implemented, which will be referred to herein as Automatic Gain Control (AGC). AGC can be implemented by varying the intensity or duty cycle of the electrical signals driving light sources 1206A and 1206B, by varying the gain of signal amplifier 1202, or both. A preferred embodiment of AGC is for the signal processing module 1200 to measure the signal levels produced by signal amplifier 1202 or detector 1203. If the signal level is below a desired level, the gain of signal amplifier 1202 is increased or the drive to light sources 1206A and 1206B is increased, and if the signal level is too high, one or both of these is similarly decreased.

One complication of AGC occurs if a low pass filter or other filter with state information about previous inputs or outputs is used as described above. If the gain is suddenly changed, the signal levels going into the low pass filter will suddenly change, but the state of such filters will not suddenly change, and will take some time to reach the new level of the input values. During the time that this change is taking place, the output values of the filter will be invalid and incorrect behavior of signal processing module 1200 is likely. To avoid this problem, especially if the filter is implemented as software, the system can update the state of the filter values according to the change in gain. For example, consider the equation for a simple digital low pass filter $$\text{Output}(t) = k1\ \text{Output}(t-1) + k2\ \text{Input}(t) + k3\ \text{Input}(t-1)$$

In this example, the output value of the filter at time t is equal to a constant k1 times the output at the previous time point, t−1, plus k2 times the input to the filter at time t, plus k3 times the input at the previous time point. If the gain of signal amplifier 1202 is increased by a factor of two, the value of Input (t) will also increase by approximately two. According to the preferred embodiment of AGC, the software will automatically also multiply the state values of Output (t−1) and Input (t−1) by two, so that the overall filter behavior is the same as if the gain had previously been at its newly-increased value. Changing the state of other types of digital filters using the above method will be apparent to those of ordinary skill in the art.

Separate Sensing and Remote Subsystems

Figure 13:
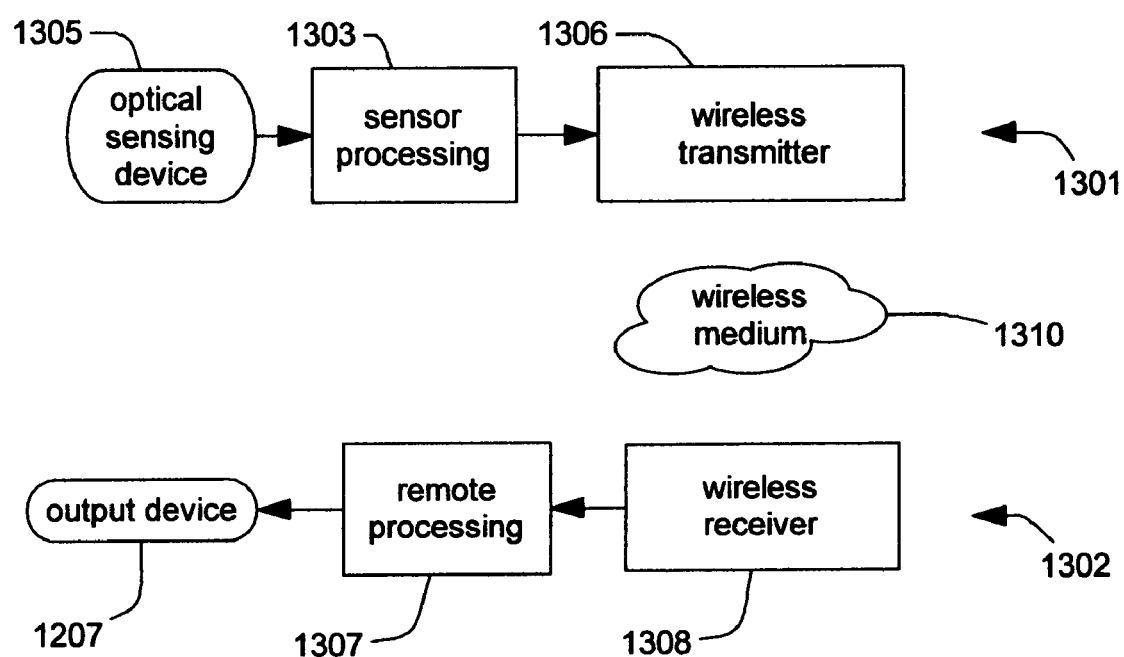
FIG. 13 shows a block diagram of the invention as two physically-distinct subsystems.

FIG. 13 shows a block diagram of the invention as two physically-distinct subsystems. As described above, all the electronics can be mounted in the electronics module 1102 shown in FIG. 11 or in enclosure 806 shown in FIG. 8. Alternately, however, it is possible to separate the functions of the device into two separate physical containers, so that a sensing unit 1301 can be very small and use very little power. A separate remote unit 1302 is an electronics box that preferably contains higher-power processing and output functions of the system.

Optical sensing device 1305 contains the optical devices, for example photodetectors 1201A and 1201B and light sources 1206A and 1206B shown in FIG. 12, as well as circuitry to drive the light sources, amplify the received light signals, and convert the signals into measurement data that can be used to calculate distances or information related to distances. Sensor processing 1303 performs conversions of the measurement data into a form suitable for transmission from wireless transmitter 1306. Sensor processing 1303 could be as simple as a passive coupling circuit to connect the output of optical sensing device 1305 into the voltage levels needed by wireless transmitter 1306. Preferably, however, the output of sensor processing 1303 is a set of parameters representing the user output, and is found as described for Output Transformation 1204 in FIG. 12. Optionally, sensor processing 1303 also contains control input circuitry, such as a switch, for the user to control operation of the system. A wireless link is created by wireless transmitter 1306, wireless receiver 1308, and wireless medium 1310. Wireless transmitter 1306 preferably transmits the data and control information from sensor processing 1303 through the wireless medium 1310. Preferably, the wireless transmitter 1306 transmits numbers that are digitized values extracted by sensor processing 1303.

In the remote unit 1302, Wireless Receiver 1308 receives the signals from wireless medium 1310, and remote processing 1307 performs any processing of the data, for example, transforming the data into the actual tones, pulses, and/or vibrations, and provides an electrical output signal in a form needed by Output Device 1207, using techniques similar to those described previously for Power driver 1205. The functions performed by remote processing 1307 depend on how much functionality is included in sensor processing 1303. For example, if sensor processing 1303 is simply a coupling circuit, more sophisticated processing will be required at remote processing 1307 to generate the output to Output Device 1207. On the other hand, sensor processing 1303 could be very sophisticated and generate real-time signals corresponding to the output pulses or other characteristics needed by output Device 1207, which would imply that remote processing 1307 could simply be a passive circuit to connect wireless receiver 1308 to output device 1207. The choice of how to divide the processing between sensor processing 1303 and remote processing 1307 will depend on the type of signal processing circuitry in each unit, the power drain permissible at each unit, and on how much electrical power is required by the circuitry for the needed processing power. These design choices will be apparent from the art. Preferably, the functions of the system are divided between sensing unit 1301 and remote unit 1302 as described here. However, other divisions of the functions are possible with the present invention, such as transmitting raw data from photodetectors from wireless transmitter 1306 and in turn doing more of the data processing within remote processing 1307.

Although a small, wired link between sensing unit 1301 and remote unit 1302 could alternately be used (which could also provide power to sensing unit 1301), it is preferable to use the wireless medium 1310 for transmission of these signals, to avoid possible entanglement or discomfort caused by a wire. Although sensing unit 1301 will require a power source for its circuitry, typically, the output device 1207 uses the most power of any single component in the system, so this separation could make battery life of a small battery in sensing unit 1301 much longer. There may also be some power savings by including some of the processing in remote processing 1307. Size savings will also be realized, as typically a much larger battery, capacitor, or other power source can be used with remote unit 1302 than with a small sensing unit 1301 such as a ring or watch.

The sensing unit 1301 preferably is configured as a ring similar to ring-based distance sensor 1100, but could alternately be a watch, bracelet, pen, or other small package. Examples of how the remote unit 1302 could be packaged include as a watch, pager, key chain or key ring, a wired or wireless earphone or headset, something to be placed in a pocket, pendant or necklace, or integrated with a portable music player, cell phone, PDA, pager, etc. The remote unit 1302 could also be configured as an accessory for a portable device designed especially for visually-impaired people, or could be part of an accessory attachment that attaches to an existing portable device to make the device more accessible to the blind user.

The control of the system could be either from the sensing unit 1301 or from the remote unit 1302. If control buttons or other control inputs are provided at the remote unit 1302, sensing unit 1301 could optionally also have a receiver and remote unit 1302 also have a transmitter, so that remote unit 1302 could control the modes of the sensing unit and turn it on and off. In the off state, sensing unit 1301 could periodically listen for a "wake up" signal from remote unit 1302. If the control inputs are provided at sensing unit 1301, similarly, the remote unit 1302 could listen for "wake up" and "sleep" commands from the sensing unit to save power. A possible kind of control switch on sensing unit 1301 is a capacitive touch sensor, in which taps of certain duration or pattern would be used to control the system without the need for physically-moving switches and their associated size and appearance. In addition to control buttons, it would be possible to make voice actuated control or control through detection of body motions by having accelerometers or voice recognition in remote unit 1302. Although these advanced capabilities could be packaged in sensing unit 1301, it is preferable to have them in the remote unit 1302, because its space and power constraints are likely to be much less severe.

Examples of wireless link technologies applicable to the present invention are a standard radio link, such as Bluetooth or other well-known radio links. The human body could also be used as the wireless medium 1310, by coupling an antenna output from wireless transmitter 1306 from the circuit to the user's skin, and preferably likewise connecting to the skin at the receiver in remote unit 1302. Alternately, a two-conductor dipole connection to the user's skin could be done at sensing unit 1301 with two electrodes. Either one or two electrodes could be used at the wireless receiver 1308 to receive these signals. If the wireless receiver 1308 is mounted near sensing unit 1301, such as when sensing unit 1301 is packaged as a ring and remote unit 1302 is packaged as a watch enclosure on the same arm, the dipole approach will be most practical. Lower frequency links could be used in that case, as low as in the audio frequency range. Preferably, any wireless signals from wireless transmitter 1306 would be at a frequency or amplitude that does not cause interactions with the nervous system. It is known that higher frequencies (e.g., above 10's of kHz) generally tend not to stimulate the nervous system as much, nor do low-amplitude signals. It may not be necessary for the conductive materials in signal-transmission electrodes to directly touch the skin. A thin insulating layer would also allow an electrical connection through the capacitance between the electrode and the body.

Dipole Wireless Link

Figure 14:
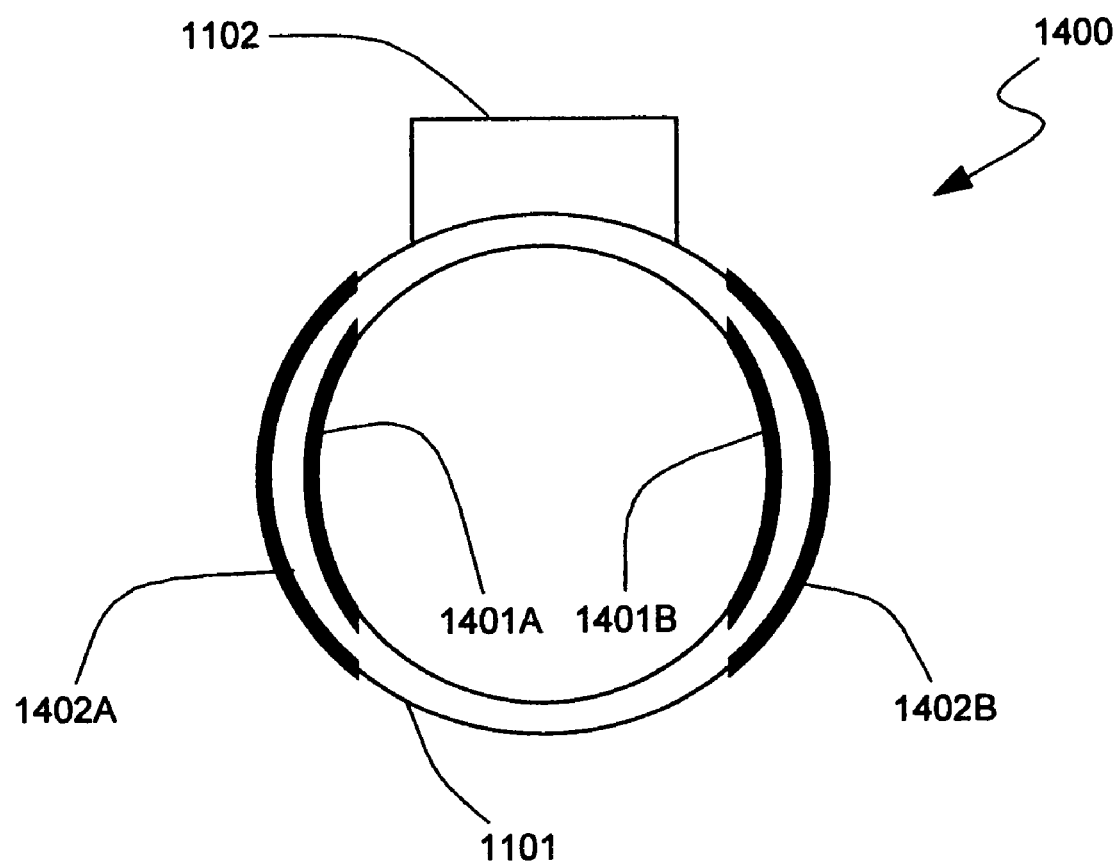
FIG. 14 shows a preferred embodiment of a ring-based dipole that can be used as part of a wireless transmitter to use the human body as a wireless medium.

FIG. 14 depicts a preferred embodiment of a ring-based dipole 1400 that can be used as part of wireless transmitter 1306 to use the human body as wireless medium 1310. Ring-based dipole 1400 uses principles of operation similar to the wireless signal transmission system described in U.S. Pat. No. 6,972,690 to Schaefer. The transmitted signal from electronics module 1102 is coupled to interior dipole conductors 1401A and 1401B, which are mounted on the ring 1101, make contact with the finger of the user, and cause current to flow in the body of the user. Interior conductors 1401A and 1401B are insulated from the ring 1101 so as to avoid a short circuit between them. However, the field produced by interior conductors 1401A and 1401B may not be very large, because they are close together with respect to the size of the user's hand and body. To create a larger field, one or more exterior conductors 1402A and 1402B are preferably provided. Rather than making contact with the finger that ring 1101 is on, exterior conductors 1402A and 1402B make contact with one or more of the other fingers on the user's hand. By contacting other fingers, for example, the two adjacent fingers, current from electronics module 1102 flows over a longer path between the exterior conductors 1402A and 1402B and thus creates a larger transmitted field in and around the body. If the user's thumb touches exterior conductors 1402A or 1402B, a relatively large electrical path would be created. The ring-based dipole 1400 may include any number of interior conductors 1401A and 1401B and exterior conductors 1402A and 1402B. An optional feature is for electronics module 1102 to sense which interior conductors 1401A and 1401B and exterior conductors 1402A and 1402B are making contact, by measuring the impedance between the conductors 1401A and 1401B and 1402A and 1402B, and, by virtue of the impedance measurement being within a specified range, switch the signal to the ones that will give the largest transmitted field. Optionally, such an impedance sensing feature can also be utilized as a control input into electronics module 1102. The user could alternately connect and separate adjacent fingers, for example, with a particular timing, to modulate the measured impedance involving exterior conductors 1402A and 1402B and thus to provide control commands to the ring-based distance sensor 1100.

The wireless receiver 1302 may use a similar signal-coupling approach as shown for ring-based dipole 1400, with its own dipole conductors arranged in an interior or exterior fashion, or simply by having two elements in contact or near the body. Alternately, wireless receiver 1302 may use a standard antenna or inductive pickup to receive the transmitted signal from wireless transmitter 1301. Alternately, wireless receiver 1302 may have a single conductor that couples to the body, such as a metal plate or case with metallic parts that couple to the user's body with capacitance. It will also be apparent that the ring-based dipole structure can also be used on other types of packaging than a ring on a finger, for example, with a wristband distance sensor 800.

Recharger

Figure 15A:
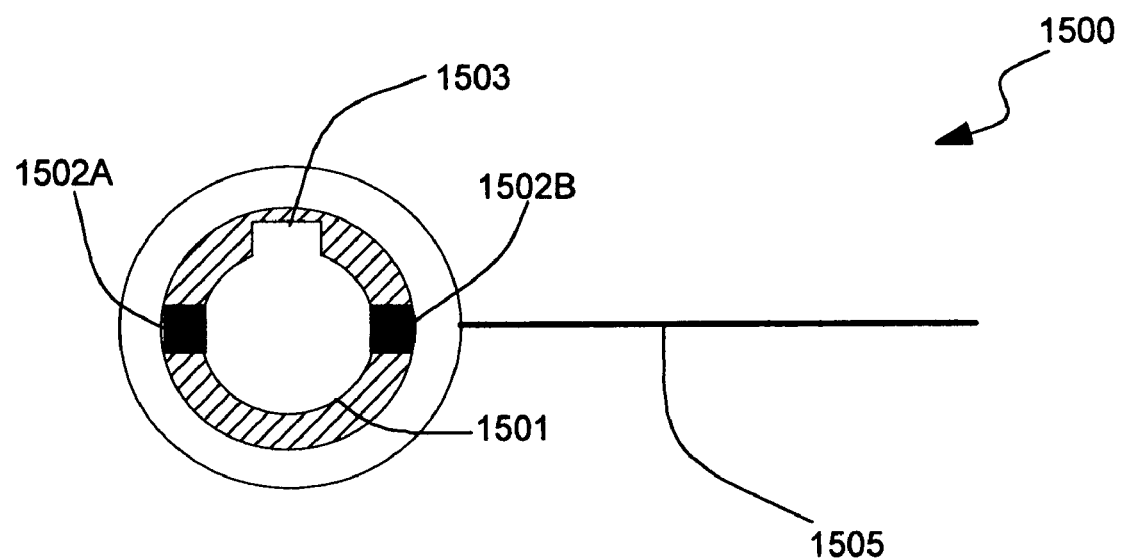
FIGS. 15A and 15B shows a top view and a side view of a preferred embodiment of a charger for the present invention.
Figure 15B:
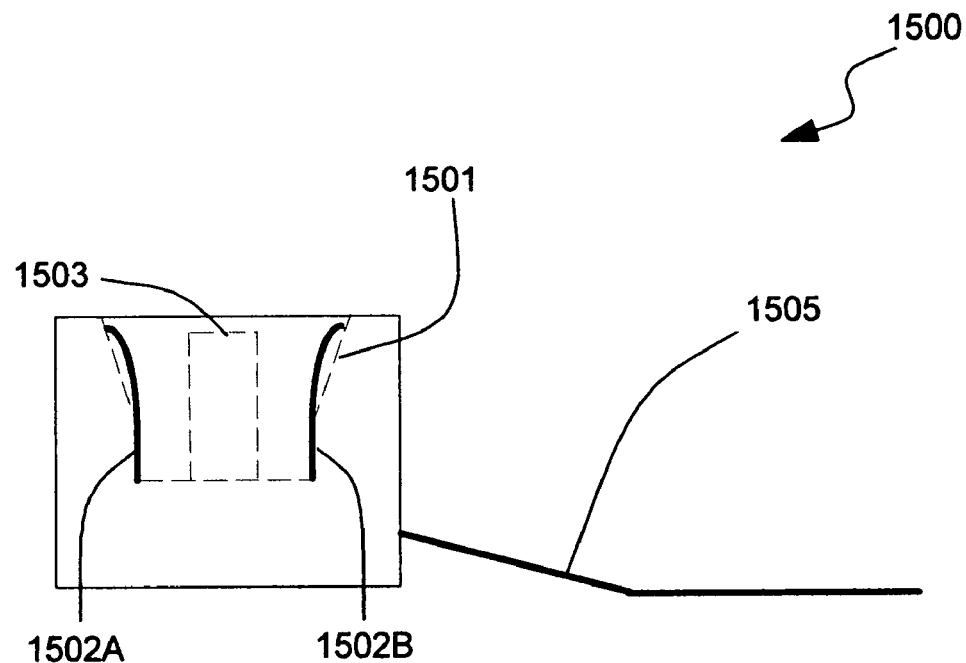

FIGS. 15A and 15B depict a top view and a side view of a preferred embodiment of a charger 1500 for the present invention. Preferably, the ring-based distance sensor 1100 will have internal circuitry for recharging its power source, which can be for example, a battery or a capacitor, such as a dual-layer capacitor. Although it would be possible to have the battery recharged by removing it, or by having a small jack for a charger, it is preferable to not have holes or connectors in the ring-based distance sensor 1100 or have the user need to remove and replace batteries. The charger 1500 preferably has a mechanical orienting feature to allow the ring-based distance sensor 1100 to be attached in one or more orientations that allow recharging. For example, recessed area 1501 in FIG. 15A is of a size that allows the ring-based distance sensor 1100 to be inserted into it. Notch 1503 is designed to fit the electronics module 1102 so that only one or two orientations of ring-based distance sensor 1100 within recessed area 1501 are possible. Charger 1500 additionally contains electrodes 1502A and 1502B that are made of spring steel or other spring-like substance, so that as ring-based distance sensor 1100 is inserted, the electrodes 1502A and 1502B make good contact with corresponding electrodes on the ring-based distance sensor 1100. The electrodes on ring-based distance sensor 1100 may be the same as or similar to the exterior electrodes 1402A and 1402B or the interior electrodes 1401A and 1401B shown in FIG. 14. If the same electrodes are used both for charging and for wireless communication, internal isolation circuitry known in the art will allow their use for both purposes.

Alternately, other ways of providing connection will be apparent to those of ordinary skill in the art. For example, instead of making direct physical contact, electrodes 1502A and 1502B could alternately use capacitive coupling through a layer of insulation. Alternately, the ring electrodes 1504 could be on the electronics module 1102 itself, instead of on the band of ring-based distance sensor 1100. Another charging technology could be an inductive-type charger, such as used for cordless electric toothbrushes. A coil could be located in the electronics module 1102, or within the band of ring-based distance sensor 1100. In that case, the charger 1500 could simply be a post onto which the ring-based distance sensor 1100 is placed, so that inductive coupling would result. The orientation of an inductive-type charger could also be controlled by a notch similar to notch 1503 or other shape that ensures correct orientation of ring-based distance sensor 1100 within the charger. A solar cell for recharging could also be included with the charger 1500 as an alternate energy charging source.

The preferred embodiment of the invention includes a power cord 1505 that plugs into household or vehicular electrical sources. An alternative embodiment, however, for the case of separate sensing unit 1301 and remote unit 1302 as shown in FIG. 13 is to have a charging attachment similar to charger 1500 mounted on remote unit 1302 so that its larger battery source is used to recharge the small battery in sensing unit 1302 when the sensing unit is not being used. Remote unit 1302 may also itself be charged by including a power plug or by using a charging methodology analogous to that shown in FIGS. 15A and 15B.

Accordingly, the reader will see that the present invention can be used in a wide variety of distance measurement applications. Many of the embodiments of the present invention do not require the use of lenses or other light focusing mechanisms, and have very simple optical designs. High frequency pulses and electronics are not required by the present invention. Thus, the present invention solves the problems cost and complexity of many previous optical distance measurement approaches.

While there has been illustrated and described what is at present considered to be the preferred embodiment of the present invention, it will be understood by those skilled in the art that various changes and modifications may be made and equivalents may be substituted for elements thereof without departing from the true scope of the invention. For example, more than two light sources or light detectors could be used to obtain additional information or increased accuracy about the distance or angle to a target object. Specular reflection models (see Foley & van Dam, pp. 577-580) could alternately be used to obtain distance measurements. Other types of light sources, such as fluorescent or incandescent light could be used. Other types of light detectors, such as phototransistors and photocells could be used. Instead of sequential illumination of the light sources, the simultaneous illumination of light sources of different colors or modulation frequencies could be utilized. The head tracker could be used for many other tracking applications, such as following the motion of hands or feet or other body or mechanical parts. Many other configurations of the distance-measuring device for blind people could be created, such as hand-held, or clothing-mounted configurations. Arrays of distance-measuring devices, possibly sharing some light sources or detector components could be used with the present invention. Applications include a row of distances to monitor patients' position in beds. Although optical devices, preferably infrared, are described as the preferred embodiment of light sources and photodetectors here, other sensing technologies could also be used with the sensors. Examples include capacitive sensing of nearby objects, or acoustic methods, such as very small ultrasonic transducers. The processing and packaging of the invention for these variations would be analogous to that described herein. Therefore, it is intended that this invention not be limited to the particular embodiment disclosed, but that the invention will include all embodiments falling within the scope of the appended claims.

What is claimed is:

1. A distance measuring system for measuring a distance from a person to an object using light, comprising:
    a sensing unit, the sensing unit comprising an optical sensing means for outputting measurement data that is a function of a distance from the sensing unit to an object;
    attachment means for mounting the sensing unit on the wrist or finger of a person;
    processing means for converting the measurement data outputted by the optical sensing means of the sensing unit into a user output signal; the processing means comprising adaptive filtering means for adjusting a response rate of the user output signal in response to the distance and/or change in distance from the sensing unit to an object indicated by the outputted measurement data of the sensing unit and/or in response to the variability of the outputted measurement data of the sensing unit;

power source means for powering the distance measuring system; and a user output means that is an audio output means, a vibration output means, or an audio and vibration output means for coupling the user output signal to a person and making the person aware of an object in a nearby environment without a need for the person to grasp or hold the distance measuring system to be made aware of the object.

2. The distance measuring system according to claim 1, wherein:

the user output signal comprises one or more pulses; and a frequency of the pulses, amplitude of the pulses, duration of the pulses, or a time between the pulses varies as a function of the distance from the person to the object.

3. The distance measuring system according to claim 1, wherein:

the optical sensing means of the sensing unit comprises light detection means for outputting a varying signal that varies with an intensity of light inputted to the optical sensing means and means for changing gain applied to the varying signal; and the adaptive filtering means comprises a digital filter applied to the varying signal; and means for changing a response rate of the digital filter to the varying signal whereby state values of the digital filter are updated in response to the changes in the gain applied to the varying signal and the response rate of the digital filter is changed inversely with the variability of the varying signal to reduce errors in the user output signal from the digital filter caused by changes in the gain applied to the varying signal and improve a response time of the distance measuring system to a sensing of an object.

4. The distance measuring system according to claim 1, comprising:

body-motion control means connected to the attachment means for interpreting body motions of the wrist or finger as control inputs for controlling characteristics of the user output signal of the user output means and/or for turning the user output means on and off.

5. A distance measuring system for measuring a distance from a person to an object using light, comprising:

a sensing unit and a remote unit;

the sensing unit comprising an optical sensing means for outputting measurement data that is a function of a distance from the sensing unit to an object;

attachment means for mounting the sensing unit on the wrist or finger of a person;

processing means for converting the measurement data outputted by the optical sensing means of the sensing unit into a user output signal; the processing means comprising a sensor processing means of the sensing unit and a remote processing means of the remote unit;

power source means for powering the distance measuring system; the power source means comprising a sensing unit power source means and a remote unit power source means;

a wireless link means connecting the sensor processing means of the sensor unit with the remote processing means of the remote unit; and the remote unit comprising a charging means and a user output means; the charging means comprising an orienting means wherein the attachment means can be electrically and mechanically connected to the charging means to recharge the sensing unit power source means with the charging means; and the user output means being an audio output means, a vibration output means, or an audio and vibration output means for coupling the user output signal to a person and making the person aware of an object in a nearby environment without a need for the person to grasp or hold the distance measuring system to be made aware of the object.

6. The distance measuring system according to claim 5, wherein:

the attachment means is a ring that can be worn on the finger of a person.

7. The distance measuring system according to claim 5, wherein:

the attachment means is a wristband that can be worn on the wrist of a person.

8. The distance measuring system according to claim 5, wherein:

the remote unit is a wristband that can be worn on the wrist of a person.

9. The distance measuring system according to claim 5, wherein:

the remote unit is attached to a key ring.

10. The distance measuring system according to claim 5, further comprising:

a control input means located with the sensing unit for causing, by activation of the control input means, control signals to be transmitted over the wireless link means to the remote unit to control the user output means with the remote unit.

11. The distance measuring system according to claim 5, wherein:

the wireless link means comprises electrode means for being placed in electrical contact with a body of a person to cause, when the distance measuring system is in use, electrical signals to be conducted in the body of the person from the electrode means to connect the sensor processing means of the sensor unit with the remote processing means of the remote unit.

12. The distance measuring system according to claim 5, comprising:

body-motion control means connected to the attachment means for interpreting body motions of the wrist or finger as control inputs for controlling characteristics of the user output signal of the user output means and/or for turning the user output means on and off.

13. A distance measuring system for measuring a distance from a person to an object using light, comprising:

a sensing unit, the sensing unit comprising an optical sensing means for outputting measurement data that is a function of a distance from the sensing unit to an object;

ring attachment means for being worn on a finger of a person;

processing means for converting the measurement data outputted by the optical sensing means of the sensing unit into a user output signal; the processing means comprising adaptive filtering means for adjusting a response rate of the user output signal in response to the distance and/or change in distance from the sensing unit to an object indicated by the outputted measurement data of the sensing unit and/or in response to the variability of the outputted measurement data of the sensing unit;

power source means for powering the distance measuring system;

a user output means that is an audio output means, a vibration output means, or an audio and vibration output means for coupling the user output signal to a person and making the person aware of an object in a nearby environment without a need for the person to grasp or hold the distance measuring system to be made aware of the object; and wireless link means for being placed in contact with a body of a person to cause, when the distance measuring system is in use, electrical signals to be conducted in the body of the person; the wireless link means comprising electrode means on an exterior surface of the ring attachment means and not in electrical contact with the finger on which the ring attachment means is placed for making electrical contact with a second finger of the person to create a transmission path for the wireless link means involving the second finger of the person whereby a person can control the transmission path by making physical contact between the electrode means of the wireless link means and the second finger of the person.

14. The distance measuring system according to claim 13, comprising:

contact sensing means for sensing when the one or more electrode means on the exterior surface of the ring attachment means are in electrical contact with the one or more other fingers of the person.

15. The distance measuring system according to claim 14, wherein: the contact sensing means comprises a capacitive sensor.

* * * * *